United States Patent
Bonalle et al.

(10) Patent No.: US 7,762,457 B2
(45) Date of Patent: Jul. 27, 2010

(54) SYSTEM AND METHOD FOR DYNAMIC FOB SYNCHRONIZATION AND PERSONALIZATION

(75) Inventors: David S. Bonalle, New Rochelle, NY (US); Carl Larkin, Bognore Regis (GB); Peter D. Saunders, Salt Lake City, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 1348 days.

(21) Appl. No.: 10/710,570

(22) Filed: Jul. 21, 2004

(65) Prior Publication Data
US 2005/0033689 A1 Feb. 10, 2005

Related U.S. Application Data

(63) Continuation of application No. 10/340,352, filed on Jan. 10, 2003, which is a continuation of application No. 10/192,488, filed on Jul. 9, 2002, now Pat. No. 7,239,226, said application No. 10/340,352 and a continuation of application No. 10/318,432, filed on Dec. 13, 2002, and a continuation of application No. 10/318,480, filed on Dec. 13, 2002, now Pat. No. 7,249,112.

(60) Provisional application No. 60/304,216, filed on Jul. 10, 2001, provisional application No. 60/396,577, filed on Jul. 16, 2002.

(51) Int. Cl.
*G06K 15/00* (2006.01)

(52) U.S. Cl. ............... 235/383; 235/376; 340/10.31; 340/10.32; 705/16

(58) Field of Classification Search .......... 705/16, 705/15; 706/16; 455/414.1; 340/5.61, 5.65, 340/10.31, 10.34; 235/376, 380, 382, 383
See application file for complete search history.

(56) References Cited

U.S. PATENT DOCUMENTS
4,072,930 A * 2/1978 Lucero et al. .......... 463/47

FOREIGN PATENT DOCUMENTS
CH 689070 8/1998

(Continued)

OTHER PUBLICATIONS
International Search Report and Written Opinion of the International Searching Authority, PCT/US05/26067, May 23, 2007.

(Continued)

*Primary Examiner*—Andrew Joseph Rudy
(74) *Attorney, Agent, or Firm*—Snell & Wilmer L.L.P.

(57) ABSTRACT

A system generally for personalizing and synchronizing fob data in the context of a distributed transaction system is disclosed. A dynamic fob synchronization system may comprise point of service (POS) devices configured with transponder-readers to initiate a transaction in conjunction with a fob, an enterprise data collection unit, and a fob object database update system. An exemplary dynamic synchronization system (DSS) may comprise various fob POS devices, a secure support client server, a fob object database update system (FODUS), one or more enterprise data synchronization interfaces (EDSI), an update logic system, one or more enterprise data collection units (EDCUs), and one or more fob POS devices configured to interoperably accept and interface with fobs. In an exemplary embodiment, DSS may comprise a personalization system and an account maintenance system configured to communicate with FODUS. Personalization of multi-function fobs may be accomplished using a security server configured to generate and/or retrieve cryptographic key information from multiple enterprise key systems during the final phase of the fob issuance process.

4 Claims, 16 Drawing Sheets

U.S. PATENT DOCUMENTS

| | | |
|---|---|---|
| 4,303,904 A | 12/1981 | Chasek |
| 4,443,027 A | 4/1984 | McNeely et al. |
| 4,450,535 A | 5/1984 | de Pommery et al. |
| 4,475,308 A | 10/1984 | Heise et al. |
| 4,583,766 A | 4/1986 | Wessel |
| 4,639,765 A | 1/1987 | dHont |
| 4,672,021 A | 6/1987 | Blumel et al. |
| 4,700,055 A | 10/1987 | Kashkashian, Jr. |
| 4,736,094 A | 4/1988 | Yoshida |
| 4,739,328 A | 4/1988 | Koelle et al. |
| 4,837,422 A | 6/1989 | Dethloff et al. |
| 4,839,504 A | 6/1989 | Nakano |
| 4,868,849 A | 9/1989 | Tamaoki |
| 4,961,142 A | 10/1990 | Elliott et al. |
| 5,016,274 A | 5/1991 | Micali et al. |
| 5,023,782 A | 6/1991 | Lutz et al. |
| 5,023,908 A | 6/1991 | Weiss |
| 5,025,372 A | 6/1991 | Burton et al. |
| 5,053,774 A | 10/1991 | Schuermann et al. |
| 5,099,226 A | 3/1992 | Andrews |
| 5,101,200 A | 3/1992 | Swett |
| 5,197,140 A | 3/1993 | Balmer |
| 5,202,826 A | 4/1993 | McCarthy |
| 5,212,777 A | 5/1993 | Gove et al. |
| 5,221,838 A | 6/1993 | Gutman et al. |
| 5,222,282 A | 6/1993 | Sukonnik et al. |
| 5,226,989 A | 7/1993 | Sukonnik |
| 5,231,273 A * | 7/1993 | Caswell et al. ............... 235/385 |
| 5,239,654 A | 8/1993 | Ing Simmons et al. |
| 5,247,304 A | 9/1993 | dHont |
| 5,274,392 A | 12/1993 | dHont et al. |
| 5,276,311 A | 1/1994 | Hennige |
| 5,285,100 A | 2/1994 | Byatt |
| 5,305,002 A | 4/1994 | Holodak et al. |
| 5,326,964 A | 7/1994 | Risser |
| 5,329,617 A | 7/1994 | Asal |
| 5,331,138 A | 7/1994 | Saroya |
| 5,339,447 A | 8/1994 | Balmer |
| 5,349,357 A | 9/1994 | Schurmann et al. |
| 5,351,052 A | 9/1994 | dHont et al. |
| 5,365,551 A | 11/1994 | Snodgrass et al. |
| 5,371,896 A | 12/1994 | Gove et al. |
| 5,373,303 A | 12/1994 | dHont |
| 5,397,881 A | 3/1995 | Mannik |
| 5,407,893 A | 4/1995 | Koshizuka et al. |
| 5,408,243 A | 4/1995 | dHont |
| 5,410,649 A | 4/1995 | Gove |
| 5,428,363 A | 6/1995 | dHont |
| 5,453,747 A | 9/1995 | dHont et al. |
| 5,461,217 A | 10/1995 | Claus |
| 5,471,592 A | 11/1995 | Gove et al. |
| 5,485,510 A | 1/1996 | Colbert |
| 5,488,376 A | 1/1996 | Hurta et al. |
| 5,489,411 A | 2/1996 | Jha et al. |
| 5,489,908 A | 2/1996 | Orthmann et al. |
| 5,490,079 A | 2/1996 | Sharpe et al. |
| 5,491,483 A | 2/1996 | dHont |
| 5,491,484 A | 2/1996 | Schuermann |
| 5,491,715 A | 2/1996 | Flaxl |
| 5,493,312 A | 2/1996 | Knebelkamp |
| 5,497,121 A | 3/1996 | dHont |
| 5,500,513 A | 3/1996 | Langhans et al. |
| 5,500,651 A | 3/1996 | Schuermann |
| 5,513,525 A | 5/1996 | Schurmann |
| 5,519,381 A | 5/1996 | Marsh et al. |
| 5,522,083 A | 5/1996 | Gove et al. |
| 5,525,992 A | 6/1996 | Froschermeier |
| 5,525,994 A | 6/1996 | Hurta et al. |
| 5,530,232 A | 6/1996 | Taylor |
| 5,537,314 A | 7/1996 | Kanter |
| 5,541,604 A | 7/1996 | Meier |
| 5,543,798 A | 8/1996 | Schuermann |
| 5,544,246 A | 8/1996 | Mandelbaum et al. |
| 5,548,291 A | 8/1996 | Meier et al. |
| 5,550,536 A | 8/1996 | Flaxl |
| 5,550,548 A | 8/1996 | Schuermann |
| 5,552,789 A | 9/1996 | Schuermann |
| 5,557,279 A | 9/1996 | dHont |
| 5,557,516 A | 9/1996 | Hogan |
| 5,561,430 A | 10/1996 | Knebelkamp |
| 5,563,582 A | 10/1996 | dHont |
| 5,569,187 A | 10/1996 | Kaiser |
| 5,572,226 A | 11/1996 | Tuttle |
| 5,577,109 A | 11/1996 | Stimson et al. |
| 5,577,120 A | 11/1996 | Penzias |
| 5,578,808 A | 11/1996 | Taylor |
| 5,581,630 A | 12/1996 | Bonneau, Jr. |
| 5,585,787 A | 12/1996 | Wallerstein |
| 5,590,038 A | 12/1996 | Pitroda |
| 5,592,150 A | 1/1997 | dHont |
| 5,592,405 A | 1/1997 | Gove et al. |
| 5,594,227 A | 1/1997 | Deo |
| 5,594,233 A | 1/1997 | Kenneth et al. |
| 5,594,448 A | 1/1997 | dHont |
| 5,597,534 A | 1/1997 | Kaiser |
| 5,600,175 A | 2/1997 | Orthmann |
| 5,602,538 A | 2/1997 | Orthmann et al. |
| 5,602,919 A | 2/1997 | Hurta et al. |
| 5,604,342 A | 2/1997 | Fujioka |
| 5,606,520 A | 2/1997 | Gove et al. |
| 5,606,594 A | 2/1997 | Register et al. |
| 5,607,522 A | 3/1997 | McDonnell |
| 5,608,406 A | 3/1997 | Eberth et al. |
| 5,608,778 A | 3/1997 | Partridge, III |
| 5,613,146 A | 3/1997 | Gove et al. |
| 5,614,703 A | 3/1997 | Martin et al. |
| 5,619,207 A | 4/1997 | dHont |
| 5,621,396 A | 4/1997 | Flaxl |
| 5,621,411 A | 4/1997 | Hagl et al. |
| 5,621,412 A | 4/1997 | Sharpe et al. |
| 5,625,366 A | 4/1997 | dHont |
| 5,625,370 A | 4/1997 | dHont |
| 5,625,695 A | 4/1997 | MRaihi et al. |
| 5,629,981 A | 5/1997 | Nerlikar |
| 5,638,080 A | 6/1997 | Orthmann et al. |
| 5,640,002 A | 6/1997 | Ruppert et al. |
| 5,641,050 A | 6/1997 | Smith et al. |
| 5,646,607 A | 7/1997 | Schurmann et al. |
| 5,649,118 A | 7/1997 | Carlisle |
| 5,657,388 A | 8/1997 | Weiss |
| 5,660,319 A | 8/1997 | Falcone et al. |
| 5,673,106 A | 9/1997 | Thompson |
| 5,675,342 A | 10/1997 | Sharpe |
| 5,686,920 A | 11/1997 | Hurta et al. |
| 5,689,100 A | 11/1997 | Carrithers et al. |
| 5,691,731 A | 11/1997 | vanErven |
| 5,692,132 A | 11/1997 | Hogan |
| 5,696,913 A | 12/1997 | Gove et al. |
| 5,698,837 A | 12/1997 | Furuta |
| 5,699,528 A | 12/1997 | Hogan |
| 5,701,127 A | 12/1997 | Sharpe |
| 5,704,046 A | 12/1997 | Hogan |
| 5,705,798 A | 1/1998 | Tarbox |
| 5,715,399 A | 2/1998 | Bezos |
| 5,721,781 A | 2/1998 | Deo et al. |
| 5,724,424 A | 3/1998 | Gifford |
| 5,729,053 A | 3/1998 | Orthmann |
| 5,729,236 A | 3/1998 | Flaxl |
| 5,731,957 A | 3/1998 | Brennan |
| 5,732,579 A | 3/1998 | dHont et al. |
| 5,734,838 A | 3/1998 | Robinson et al. |
| 5,742,756 A | 4/1998 | Dillaway et al. |
| 5,742,845 A | 4/1998 | Wagner |
| 5,748,137 A | 5/1998 | dHont |

| | | | | | |
|---|---|---|---|---|---|
| 5,748,737 A | 5/1998 | Daggar | 5,917,168 A | 6/1999 | Nakamura et al. |
| 5,758,195 A | 5/1998 | Balmer | 5,918,216 A | 6/1999 | Miksovsky et al. |
| 5,761,306 A | 6/1998 | Lewis | 5,920,628 A | 7/1999 | Indeck et al. |
| 5,761,493 A | 6/1998 | Blakeley et al. | 5,923,734 A | 7/1999 | Taskett |
| 5,768,385 A | 6/1998 | Simon | 5,929,801 A | 7/1999 | Aslanidis et al. |
| 5,768,609 A | 6/1998 | Gove et al. | 5,930,767 A | 7/1999 | Reber et al. |
| 5,770,843 A | 6/1998 | Rose | 5,930,777 A | 7/1999 | Barber |
| 5,774,882 A | 6/1998 | Keen et al. | 5,931,917 A | 8/1999 | Nguyen et al. |
| 5,777,903 A | 7/1998 | Piosenka | 5,933,624 A | 8/1999 | Balmer |
| 5,778,067 A | 7/1998 | Jones et al. | 5,943,624 A | 8/1999 | Fox et al. |
| 5,778,069 A | 7/1998 | Thomlinson et al. | 5,948,116 A | 9/1999 | Aslanidis et al. |
| 5,785,680 A | 7/1998 | Niezink et al. | 5,949,044 A | 9/1999 | Walker et al. |
| 5,792,337 A | 8/1998 | Padovani et al. | 5,949,876 A | 9/1999 | Ginter et al. |
| 5,793,324 A | 8/1998 | Aslanidis et al. | 5,953,512 A | 9/1999 | Cai et al. |
| 5,794,095 A | 8/1998 | Thompson | 5,953,710 A | 9/1999 | Fleming |
| 5,797,060 A | 8/1998 | Thompson | 5,955,717 A | 9/1999 | Vanstone |
| 5,797,085 A | 8/1998 | Buek et al. | 5,955,969 A | 9/1999 | dHont |
| 5,797,133 A | 8/1998 | Jones et al. | 5,956,024 A | 9/1999 | Strickland et al. |
| 5,798,709 A | 8/1998 | Flaxl | 5,956,699 A | 9/1999 | Wong et al. |
| 5,809,142 A | 9/1998 | Hurta et al. | 5,958,004 A | 9/1999 | Helland et al. |
| 5,809,288 A | 9/1998 | Balmer | 5,960,411 A | 9/1999 | Hartman et al. |
| 5,809,633 A | 9/1998 | Mundigl et al. | 5,963,915 A | 10/1999 | Kirsch |
| 5,825,007 A | 10/1998 | Jesadanont | 5,963,924 A | 10/1999 | Williams et al. |
| 5,825,302 A | 10/1998 | Stafford | 5,966,697 A | 10/1999 | Fergerson et al. |
| 5,826,077 A | 10/1998 | Blakeley et al. | 5,970,148 A | 10/1999 | Meier |
| 5,826,241 A | 10/1998 | Stein et al. | 5,970,471 A | 10/1999 | Hill |
| 5,826,242 A | 10/1998 | Montulli | 5,970,472 A | 10/1999 | Allsop et al. |
| 5,826,243 A | 10/1998 | Musmanno et al. | 5,970,473 A | 10/1999 | Gerszberg et al. |
| 5,828,044 A | 10/1998 | Jun et al. | 5,970,475 A | 10/1999 | Barnes et al. |
| 5,834,756 A | 11/1998 | Gutman et al. | RE36,365 E | 11/1999 | Levine et al. |
| 5,835,894 A | 11/1998 | Adcock et al. | 5,978,840 A | 11/1999 | Nguyen et al. |
| 5,841,364 A | 11/1998 | Hagl et al. | 5,979,757 A | 11/1999 | Tracy et al. |
| 5,842,088 A | 11/1998 | Thompson | 5,982,293 A | 11/1999 | Everett et al. |
| 5,844,218 A | 12/1998 | Kawan et al. | 5,983,207 A | 11/1999 | Turk et al. |
| 5,844,230 A | 12/1998 | Lalonde | 5,983,208 A | 11/1999 | Haller |
| 5,845,267 A | 12/1998 | Ronen | 5,987,140 A | 11/1999 | Rowney et al. |
| 5,851,149 A | 12/1998 | Xidos et al. | 5,987,155 A | 11/1999 | Dunn et al. |
| 5,852,812 A | 12/1998 | Reeder | 5,987,498 A | 11/1999 | Athing et al. |
| 5,854,891 A | 12/1998 | Postlewaite et al. | 5,989,950 A | 11/1999 | Wu |
| 5,858,006 A | 1/1999 | Van der AA et al. | 5,991,413 A | 11/1999 | Arditti et al. |
| 5,859,419 A | 1/1999 | Wynn | 5,991,608 A | 11/1999 | Leyten |
| 5,859,779 A | 1/1999 | Giordano et al. | 5,991,748 A | 11/1999 | Taskett |
| 5,862,325 A | 1/1999 | Reed et al. | 5,991,750 A | 11/1999 | Watson |
| 5,864,306 A | 1/1999 | Dwyer et al. | 5,996,076 A | 11/1999 | Rowney et al. |
| 5,864,323 A | 1/1999 | Berthon | 5,999,914 A | 12/1999 | Blinn et al. |
| 5,864,830 A | 1/1999 | Armetta et al. | 6,000,832 A | 12/1999 | Franklin et al. |
| 5,867,100 A | 2/1999 | dHont | 6,002,438 A | 12/1999 | Hocevar et al. |
| 5,870,031 A | 2/1999 | Kaiser et al. | 6,002,767 A | 12/1999 | Kramer |
| 5,870,915 A | 2/1999 | dHont | 6,003,014 A | 12/1999 | Lee et al. |
| 5,878,138 A | 3/1999 | Yacobi | 6,005,942 A | 12/1999 | Chan et al. |
| 5,878,141 A | 3/1999 | Daly et al. | 6,006,216 A | 12/1999 | Griffin et al. |
| 5,878,215 A | 3/1999 | Kling et al. | 6,009,412 A | 12/1999 | Storey |
| 5,878,337 A | 3/1999 | Joao et al. | 6,011,487 A | 1/2000 | Plocher |
| 5,878,403 A | 3/1999 | DeFrancesco et al. | 6,012,039 A | 1/2000 | Hoffman et al. |
| 5,880,675 A | 3/1999 | Trautner | 6,012,049 A | 1/2000 | Kawan |
| 5,881,272 A | 3/1999 | Balmer | 6,012,143 A | 1/2000 | Tanaka |
| 5,883,810 A | 3/1999 | Franklin et al. | 6,012,636 A | 1/2000 | Smith |
| 5,884,280 A | 3/1999 | Yoshioka et al. | 6,014,634 A | 1/2000 | Scroggie et al. |
| 5,887,266 A | 3/1999 | Heinonen et al. | 6,014,635 A | 1/2000 | Harris et al. |
| 5,890,137 A | 3/1999 | Koreeda | 6,014,636 A | 1/2000 | Reeder |
| 5,897,622 A | 4/1999 | Blinn et al. | 6,014,645 A | 1/2000 | Cunningham |
| 5,898,783 A | 4/1999 | Rohrbach | 6,014,646 A | 1/2000 | Vallee et al. |
| 5,898,838 A | 4/1999 | Wagner | 6,014,648 A | 1/2000 | Brennan |
| 5,903,830 A | 5/1999 | Joao et al. | 6,014,650 A | 1/2000 | Zampese |
| 5,903,875 A | 5/1999 | Kohara | 6,014,748 A | 1/2000 | Tushie et al. |
| 5,903,880 A | 5/1999 | Biffar | 6,016,482 A | 1/2000 | Molinari et al. |
| 5,905,798 A | 5/1999 | Nerlikar et al. | 6,016,484 A | 1/2000 | Williams et al. |
| 5,905,908 A | 5/1999 | Wagner | 6,018,717 A | 1/2000 | Lee et al. |
| 5,909,492 A | 6/1999 | Payne et al. | 6,018,718 A | 1/2000 | Walker et al. |
| 5,912,678 A | 6/1999 | Saxena et al. | 6,021,943 A | 2/2000 | Chastain |
| 5,913,203 A | 6/1999 | Wong et al. | 6,023,510 A | 2/2000 | Epstein |
| 5,914,472 A | 6/1999 | Foladare et al. | 6,024,286 A | 2/2000 | Bradley et al. |
| 5,915,023 A | 6/1999 | Bernstein | 6,029,147 A | 2/2000 | Horadan et al. |

| | | | |
|---|---|---|---|
| 6,029,149 A | 2/2000 | Dykstra et al. | |
| 6,029,150 A | 2/2000 | Kravitz | |
| 6,029,890 A | 2/2000 | Austin | |
| 6,029,892 A | 2/2000 | Miyake | |
| 6,032,136 A | 2/2000 | Brake et al. | |
| 6,038,292 A | 3/2000 | Thomas | |
| 6,038,551 A | 3/2000 | Barlow et al. | |
| 6,038,584 A | 3/2000 | Balmer | |
| 6,041,308 A | 3/2000 | Walker et al. | |
| 6,044,360 A | 3/2000 | Picciallo | |
| 6,047,888 A | 4/2000 | Dethloff | |
| 6,052,675 A | 4/2000 | Checchio | |
| 6,058,418 A | 5/2000 | Kobata | |
| 6,061,344 A | 5/2000 | Wood, Jr. | |
| 6,061,789 A | 5/2000 | Hauser et al. | |
| 6,064,320 A | 5/2000 | dHont et al. | |
| 6,064,981 A | 5/2000 | Barni et al. | |
| 6,070,003 A | 5/2000 | Gove et al. | |
| 6,070,150 A | 5/2000 | Remington et al. | |
| 6,070,154 A | 5/2000 | Tavor et al. | |
| 6,070,156 A * | 5/2000 | Hartsell, Jr. | 705/413 |
| 6,072,870 A | 6/2000 | Nguyen et al. | |
| 6,073,840 A | 6/2000 | Marion | |
| 6,076,078 A | 6/2000 | Camp et al. | |
| 6,078,888 A | 6/2000 | Johnson, Jr. | |
| 6,078,906 A | 6/2000 | Huberman | |
| 6,078,908 A | 6/2000 | Schmitz | |
| 6,081,790 A | 6/2000 | Rosen | |
| RE36,788 E | 7/2000 | Mansvelt et al. | |
| 6,088,683 A | 7/2000 | Jalili | |
| 6,088,686 A | 7/2000 | Walker et al. | |
| 6,088,717 A | 7/2000 | Reed et al. | |
| 6,088,797 A | 7/2000 | Rosen | |
| 6,089,284 A * | 7/2000 | Kaehler et al. | 141/94 |
| 6,092,057 A | 7/2000 | Zimmerman et al. | |
| 6,092,198 A | 7/2000 | Lanzy et al. | |
| 6,098,053 A | 8/2000 | Slater | |
| 6,098,879 A * | 8/2000 | Terranova | 235/384 |
| 6,101,174 A | 8/2000 | Langston | |
| 6,102,162 A | 8/2000 | Teicher | |
| 6,102,672 A | 8/2000 | Woollenweber | |
| 6,105,008 A | 8/2000 | Davis et al. | |
| 6,105,013 A | 8/2000 | Curry et al. | |
| 6,105,865 A | 8/2000 | Hardesty | |
| 6,108,641 A | 8/2000 | Kenna et al. | |
| 6,109,525 A | 8/2000 | Blomqvist et al. | |
| 6,112,152 A | 8/2000 | Tuttle | |
| 6,112,191 A | 8/2000 | Burke | |
| 6,115,360 A | 9/2000 | Quay et al. | |
| 6,115,458 A | 9/2000 | Taskett | |
| 6,116,423 A | 9/2000 | Troxtell, Jr. et al. | |
| 6,116,505 A | 9/2000 | Withrow | |
| 6,118,189 A | 9/2000 | Flaxl | |
| 6,121,544 A | 9/2000 | Petsinger | |
| 6,122,625 A | 9/2000 | Rosen | |
| 6,123,223 A | 9/2000 | Watkins | |
| 6,125,352 A | 9/2000 | Franklin et al. | |
| 6,129,274 A | 10/2000 | Suzuki | |
| 6,133,834 A | 10/2000 | Eberth et al. | |
| 6,141,651 A | 10/2000 | Riley et al. | |
| 6,141,752 A | 10/2000 | Dancs et al. | |
| 6,163,771 A | 12/2000 | Walker et al. | |
| 6,167,236 A | 12/2000 | Kaiser et al. | |
| 6,173,269 B1 | 1/2001 | Sokol et al. | |
| 6,173,272 B1 | 1/2001 | Thomas et al. | |
| 6,177,860 B1 | 1/2001 | Cromer et al. | |
| 6,179,205 B1 | 1/2001 | Sloan | |
| 6,179,206 B1 | 1/2001 | Matsumori | |
| 6,188,994 B1 | 2/2001 | Egendorf | |
| 6,189,787 B1 | 2/2001 | Dorf | |
| 6,192,255 B1 | 2/2001 | Lewis et al. | |
| 6,198,728 B1 | 3/2001 | Hulyalkar et al. | |
| 6,198,875 B1 | 3/2001 | Edenson et al. | |
| 6,202,927 B1 | 3/2001 | Bashan et al. | |
| 6,205,151 B1 | 3/2001 | Quay et al. | |
| 6,206,293 B1 | 3/2001 | Gutman et al. | |
| 6,213,390 B1 | 4/2001 | Oneda | |
| 6,215,437 B1 | 4/2001 | Schurmann et al. | |
| 6,216,219 B1 | 4/2001 | Cai et al. | |
| 6,219,439 B1 | 4/2001 | Burger | |
| 6,220,510 B1 | 4/2001 | Everett et al. | |
| 6,222,914 B1 | 4/2001 | McMullin | |
| D442,627 S | 5/2001 | Webb et al. | |
| D442,629 S | 5/2001 | Webb et al. | |
| 6,223,984 B1 | 5/2001 | Renner et al. | |
| 6,226,382 B1 | 5/2001 | MRaihi et al. | |
| 6,227,447 B1 | 5/2001 | Campisano | |
| 6,230,270 B1 | 5/2001 | Laczko, Sr. | |
| 6,232,917 B1 | 5/2001 | Baumer et al. | |
| 6,233,683 B1 | 5/2001 | Chan et al. | |
| 6,237,848 B1 | 5/2001 | Everett | |
| 6,239,675 B1 | 5/2001 | Flaxl | |
| 6,240,187 B1 | 5/2001 | Lewis | |
| 6,248,199 B1 | 6/2001 | Smulson | |
| 6,257,486 B1 | 7/2001 | Teicher et al. | |
| 6,259,769 B1 | 7/2001 | Page et al. | |
| 6,260,026 B1 | 7/2001 | Tomida et al. | |
| 6,260,088 B1 | 7/2001 | Gove et al. | |
| 6,263,316 B1 | 7/2001 | Khan et al. | |
| 6,263,319 B1 * | 7/2001 | Leatherman | 705/30 |
| 6,264,106 B1 | 7/2001 | Bridgelall | |
| 6,266,754 B1 | 7/2001 | Laczko, Sr. et al. | |
| 6,267,292 B1 | 7/2001 | Walker et al. | |
| 6,269,348 B1 | 7/2001 | Pare, Jr. et al. | |
| 6,273,335 B1 | 8/2001 | Sloan | |
| 6,282,522 B1 | 8/2001 | Davis et al. | |
| D447,515 S | 9/2001 | Faenza, Jr. et al. | |
| 6,286,763 B1 | 9/2001 | Reynolds et al. | |
| 6,289,324 B1 | 9/2001 | Kawan | |
| 6,293,462 B1 | 9/2001 | Gangi | |
| 6,315,193 B1 | 11/2001 | Hogan | |
| 6,315,195 B1 | 11/2001 | Ramachandran | |
| 6,317,721 B1 | 11/2001 | Hurta et al. | |
| 6,318,636 B1 | 11/2001 | Reynolds et al. | |
| 6,323,566 B1 | 11/2001 | Meier | |
| 6,325,285 B1 | 12/2001 | Baratelli | |
| 6,325,293 B1 | 12/2001 | Moreno | |
| 6,326,934 B1 | 12/2001 | Kinzie | |
| 6,327,573 B1 | 12/2001 | Walker et al. | |
| 6,330,544 B1 | 12/2001 | Walker et al. | |
| 6,332,193 B1 * | 12/2001 | Glass et al. | 713/170 |
| 6,336,095 B1 | 1/2002 | Rosen | |
| 6,342,844 B1 | 1/2002 | Rozin | |
| 6,353,811 B1 | 3/2002 | Weissman | |
| 6,364,208 B1 | 4/2002 | Stanford et al. | |
| 6,367,011 B1 | 4/2002 | Lee et al. | |
| 6,374,245 B1 | 4/2002 | Park | |
| 6,377,034 B1 | 4/2002 | Ivanov | |
| 6,378,073 B1 | 4/2002 | Davis et al. | |
| 6,388,533 B2 | 5/2002 | Swoboda | |
| 6,390,375 B2 | 5/2002 | Kayanakis | |
| 6,400,272 B1 | 6/2002 | Holtzman et al. | |
| 6,402,026 B1 | 6/2002 | Schwier | |
| 6,402,028 B1 | 6/2002 | Graham, Jr. et al. | |
| 6,411,611 B1 | 6/2002 | van der Tuijn | |
| 6,415,978 B1 | 7/2002 | McAllister | |
| 6,422,464 B1 | 7/2002 | Terranova | |
| 6,424,029 B1 | 7/2002 | Giesler | |
| RE37,822 E | 8/2002 | Anthonyson | |
| 6,427,910 B1 | 8/2002 | Barnes et al. | |
| 6,438,235 B2 | 8/2002 | Sims, III | |
| 6,439,455 B1 | 8/2002 | Everett et al. | |
| 6,442,532 B1 | 8/2002 | Kawan | |
| 6,445,794 B1 | 9/2002 | Shefi | |
| 6,457,996 B1 | 10/2002 | Shih | |
| 6,466,804 B1 | 10/2002 | Pecen et al. | |

| | | | | | | |
|---|---|---|---|---|---|---|
| 6,473,500 B1 | 10/2002 | Risafi et al. | | 7,103,575 B1 | 9/2006 | Linehan |
| 6,480,100 B1 | 11/2002 | Frieden et al. | | 7,136,835 B1 | 11/2006 | Flitcroft et al. |
| 6,480,101 B1 | 11/2002 | Kelly et al. | | 7,213,748 B2 | 5/2007 | Tsuei et al. |
| 6,481,621 B1 | 11/2002 | Herrendoerfer et al. | | 2001/0013542 A1 | 8/2001 | Horowitz et al. |
| 6,481,632 B2 | 11/2002 | Wentker et al. | | 2001/0024157 A1 | 9/2001 | Hansmann et al. |
| 6,483,427 B1 | 11/2002 | Werb | | 2001/0034565 A1 | 10/2001 | Leatherman |
| 6,483,477 B1 | 11/2002 | Plonka | | 2001/0034720 A1 | 10/2001 | Armes |
| 6,483,929 B1 | 11/2002 | Murakami et al. | | 2001/0039617 A1 | 11/2001 | Buhrlen et al. |
| 6,484,937 B1 | 11/2002 | Devaux et al. | | 2001/0049628 A1 | 12/2001 | Icho |
| 6,490,443 B1 | 12/2002 | Freeny, Jr. | | 2002/0011519 A1 | 1/2002 | Shults |
| 6,491,229 B1 | 12/2002 | Berney | | 2002/0026419 A1 | 2/2002 | Maritzen et al. |
| 6,494,380 B2 | 12/2002 | Jarosz | | 2002/0028704 A1 | 3/2002 | Bloomfield et al. |
| 6,507,762 B1 | 1/2003 | Amro et al. | | 2002/0035548 A1 | 3/2002 | Hogan et al. |
| 6,510,983 B2 | 1/2003 | Horowitz et al. | | 2002/0046341 A1 | 4/2002 | Kazaks et al. |
| 6,510,998 B1 | 1/2003 | Stanford et al. | | 2002/0052839 A1 | 5/2002 | Takatori |
| 6,513,015 B2 | 1/2003 | Ogasawara | | 2002/0062284 A1 | 5/2002 | Kawan |
| 6,519,565 B1 | 2/2003 | Clements et al. | | 2002/0074398 A1 | 6/2002 | Lancos et al. |
| 6,520,542 B2 | 2/2003 | Thompson et al. | | 2002/0077837 A1 | 6/2002 | Krueger et al. |
| 6,529,880 B1 | 3/2003 | McKeen et al. | | 2002/0077895 A1 | 6/2002 | Howell |
| 6,535,726 B1 | 3/2003 | Johnson | | 2002/0077992 A1 | 6/2002 | Tobin |
| 6,546,373 B1 | 4/2003 | Cerra | | 2002/0079367 A1 | 6/2002 | Montani |
| 6,547,133 B1 | 4/2003 | DeVries, Jr. et al. | | 2002/0092914 A1 | 7/2002 | Pentz et al. |
| 6,549,912 B1 | 4/2003 | Chen | | 2002/0095298 A1 | 7/2002 | Ewing |
| 6,560,581 B1 | 5/2003 | Fox et al. | | 2002/0095343 A1 | 7/2002 | Barton et al. |
| 6,577,229 B1 | 6/2003 | Bonneau et al. | | 2002/0095389 A1 | 7/2002 | Gaines |
| 6,578,768 B1 | 6/2003 | Binder et al. | | 2002/0095587 A1 | 7/2002 | Doyle et al. |
| 6,581,839 B1 | 6/2003 | Lasch et al. | | 2002/0097144 A1 | 7/2002 | Collins et al. |
| 6,587,835 B1 | 7/2003 | Treyz et al. | | 2002/0107007 A1 | 8/2002 | Gerson |
| 6,588,660 B1 | 7/2003 | Buescher et al. | | 2002/0107742 A1 | 8/2002 | Magill |
| 6,589,119 B1 | 7/2003 | Orus et al. | | 2002/0109580 A1 | 8/2002 | Shreve et al. |
| 6,598,024 B1 | 7/2003 | Walker et al. | | 2002/0111210 A1 | 8/2002 | Luciano, Jr. et al. |
| 6,608,995 B1 | 8/2003 | Kawasaki et al. | | 2002/0111917 A1 | 8/2002 | Hoffman et al. |
| 6,609,655 B1 | 8/2003 | Harrell | | 2002/0113082 A1 | 8/2002 | Leatherman et al. |
| 6,623,039 B2 | 9/2003 | Thompson et al. | | 2002/0116274 A1 | 8/2002 | Hind et al. |
| 6,626,356 B2 | 9/2003 | Davenport et al. | | 2002/0120584 A1 | 8/2002 | Hogan et al. |
| 6,628,961 B1 | 9/2003 | Ho et al. | | 2002/0126010 A1 | 9/2002 | Trimble et al. |
| 6,629,591 B1 * | 10/2003 | Griswold et al. ............ 194/205 | | 2002/0131567 A1 | 9/2002 | Maginas |
| 6,636,833 B1 | 10/2003 | Flitcroft et al. | | 2002/0138438 A1 | 9/2002 | Bardwell |
| 6,650,887 B2 | 11/2003 | McGregor et al. | | 2002/0140542 A1 | 10/2002 | Prokoski et al. |
| 6,662,166 B2 | 12/2003 | Pare, Jr. et al. | | 2002/0145043 A1 | 10/2002 | Challa et al. |
| 6,665,405 B1 | 12/2003 | Lenstra | | 2002/0147913 A1 | 10/2002 | Lun Yip |
| 6,669,086 B2 | 12/2003 | Abdi et al. | | 2002/0148892 A1 | 10/2002 | Bardwell |
| 6,671,358 B1 | 12/2003 | Seidman et al. | | 2002/0152123 A1 | 10/2002 | Giordano et al. |
| 6,674,786 B1 | 1/2004 | Nakamura et al. | | 2002/0154795 A1 | 10/2002 | Lee et al. |
| 6,679,427 B1 | 1/2004 | Kuroiwa | | 2002/0166891 A1 | 11/2002 | Stoutenburg et al. |
| 6,681,328 B1 | 1/2004 | Harris et al. | | 2002/0174067 A1 | 11/2002 | Hoffman et al. |
| 6,684,269 B2 | 1/2004 | Wagner | | 2002/0176522 A1 | 11/2002 | Fan |
| 6,687,714 B1 | 2/2004 | Kogen et al. | | 2002/0178063 A1 | 11/2002 | Gravelle et al. |
| 6,690,930 B1 | 2/2004 | Dupre | | 2002/0178369 A1 | 11/2002 | Black |
| 6,693,513 B2 | 2/2004 | Tuttle | | 2002/0185543 A1 | 12/2002 | Pentz et al. |
| 6,703,918 B1 * | 3/2004 | Kita ........................ 340/5.52 | | 2002/0188501 A1 | 12/2002 | Lefkowith |
| 6,705,530 B2 | 3/2004 | Kiekhaefer | | 2002/0190125 A1 | 12/2002 | Stockhammer |
| 6,711,262 B1 | 3/2004 | Watanen | | 2002/0194303 A1 | 12/2002 | Suila et al. |
| 6,732,936 B1 | 5/2004 | Kiekhaefer | | 2002/0194503 A1 | 12/2002 | Faith et al. |
| 6,742,120 B1 | 5/2004 | Markakis et al. | | 2002/0196963 A1 | 12/2002 | Bardwell |
| 6,747,546 B1 | 6/2004 | Hikita et al. | | 2003/0009382 A1 | 1/2003 | DArbelott et al. |
| 6,760,581 B2 | 7/2004 | Dutta | | 2003/0014307 A1 | 1/2003 | Heng |
| 6,769,718 B1 | 8/2004 | Warther et al. | | 2003/0014357 A1 | 1/2003 | Chrisekos et al. |
| 6,771,981 B1 | 8/2004 | Zalewski et al. | | 2003/0014891 A1 | 1/2003 | Nelms et al. |
| 6,789,012 B1 | 9/2004 | Childs et al. | | 2003/0018532 A1 | 1/2003 | Dudek et al. |
| 6,834,270 B1 | 12/2004 | Pagani et al. | | 2003/0018567 A1 | 1/2003 | Flitcroft et al. |
| 6,853,087 B2 | 2/2005 | Neuhaus et al. | | 2003/0025600 A1 | 2/2003 | Blanchard |
| 6,853,894 B1 | 2/2005 | Kolls | | 2003/0028481 A1 | 2/2003 | Flitcroft et al. |
| 6,853,987 B1 | 2/2005 | Cook | | 2003/0046228 A1 | 3/2003 | Berney |
| 6,857,566 B2 | 2/2005 | Wankmueller | | 2003/0054836 A1 | 3/2003 | Michot |
| 6,859,672 B2 | 2/2005 | Roberts et al. | | 2003/0055727 A1 | 3/2003 | Walker et al. |
| 6,851,617 B2 | 5/2005 | Saint et al. | | 2003/0057226 A1 | 3/2003 | Long |
| 6,895,310 B1 | 5/2005 | Kolls | | 2003/0057278 A1 | 3/2003 | Wong |
| 6,994,262 B1 | 2/2006 | Warther | | 2003/0069828 A1 | 4/2003 | Blazey et al. |
| 7,003,501 B2 | 2/2006 | Ostroff | | 2003/0069846 A1 | 4/2003 | Marcon |
| 7,069,444 B2 | 6/2006 | Lowensohn et al. | | 2003/0112972 A1 | 6/2003 | Hattick et al. |
| 7,096,204 B1 | 8/2006 | Chen et al. | | 2003/0120554 A1 | 6/2003 | Hogan et al. |
| 7,100,821 B2 | 9/2006 | Rasti | | 2003/0121969 A1 | 7/2003 | Wankmueller |

| | | | |
|---|---|---|---|
| 2003/0130820 A1 | 7/2003 | Lane, III | |
| 2003/0132284 A1 | 7/2003 | Reynolds et al. | |
| 2003/0140228 A1 | 7/2003 | Binder | |
| 2003/0163699 A1 | 8/2003 | Pailles et al. | |
| 2003/0167207 A1 | 9/2003 | Berardi et al. | |
| 2003/0177347 A1 | 9/2003 | Schneier et al. | |
| 2003/0183689 A1 | 10/2003 | Swift et al. | |
| 2003/0183699 A1 | 10/2003 | Masui | |
| 2003/0187786 A1 | 10/2003 | Swift et al. | |
| 2003/0187787 A1 | 10/2003 | Freund | |
| 2003/0187790 A1 | 10/2003 | Swift et al. | |
| 2003/0187796 A1 | 10/2003 | Swift et al. | |
| 2003/0195037 A1 | 10/2003 | Vuong et al. | |
| 2003/0195842 A1 | 10/2003 | Reece | |
| 2003/0195843 A1 | 10/2003 | Matsuda et al. | |
| 2003/0200184 A1 | 10/2003 | Dominguez et al. | |
| 2003/0218066 A1 | 11/2003 | Fernandes et al. | |
| 2003/0220876 A1 | 11/2003 | Burger et al. | |
| 2003/0222153 A1 | 12/2003 | Pentz et al. | |
| 2003/0225623 A1 | 12/2003 | Wankmueller | |
| 2003/0225713 A1 | 12/2003 | Atkinson et al. | |
| 2003/0227550 A1 | 12/2003 | Manico et al. | |
| 2003/0233334 A1 | 12/2003 | Smith | |
| 2004/0006539 A1 | 1/2004 | Royer et al. | |
| 2004/0010462 A1 | 1/2004 | Moon et al. | |
| 2004/0015451 A1 | 1/2004 | Sahota et al. | |
| 2004/0016796 A1 | 1/2004 | Hann et al. | |
| 2004/0020982 A1 | 2/2004 | Hoffman et al. | |
| 2004/0029569 A1 | 2/2004 | Khan et al. | |
| 2004/0030601 A1 | 2/2004 | Pond et al. | |
| 2004/0039814 A1 | 2/2004 | Crabtree et al. | |
| 2004/0039860 A1 | 2/2004 | Mills et al. | |
| 2004/0044627 A1 | 3/2004 | Russell et al. | |
| 2004/0083184 A1 | 4/2004 | Tsuei et al. | |
| 2004/0139021 A1 | 7/2004 | Reed et al. | |
| 2005/0017068 A1 | 1/2005 | Zalewski et al. | |
| 2005/0038718 A1 | 2/2005 | Barnes et al. | |
| 2005/0040272 A1 | 2/2005 | Argumedo et al. | |
| 2005/0119978 A1 | 6/2005 | Ates | |
| 2005/0121512 A1 | 6/2005 | Wankmueller | |

FOREIGN PATENT DOCUMENTS

| | | | |
|---|---|---|---|
| EP | 0 358 525 A2 | 3/1990 | |
| EP | 0 424 726 A1 | 10/1990 | |
| EP | 0 484 726 A1 | 5/1992 | |
| EP | 0 933 717 A2 | 8/1999 | |
| EP | 0 956 818 A1 | 11/1999 | |
| EP | 0 959 440 A2 | 11/1999 | |
| EP | 0 984 404 A2 | 3/2000 | |
| EP | 1 016 947 A2 | 7/2000 | |
| EP | 1 039 403 A2 | 9/2000 | |
| EP | 1 104 909 A2 | 6/2001 | |
| EP | 1 113 387 A2 | 7/2001 | |
| EP | 1 115 095 A2 | 7/2001 | |
| EP | 1 199 684 A2 | 4/2002 | |
| EP | 1 251 450 A1 | 10/2002 | |
| GB | 2347537 | 9/2000 | |
| GB | 2 361 790 A | 10/2001 | |
| JP | 2000-1109 A | 1/2000 | |
| JP | 2000-015288 A | 1/2000 | |
| JP | 2000011109 A | 1/2000 | |
| JP | 2000-40181 A | 2/2000 | |
| JP | 2000-67312 A | 3/2000 | |
| JP | 2000-207641 A | 7/2000 | |
| JP | 2001-5931 A | 1/2001 | |
| JP | 2001-283122 A | 10/2001 | |
| WO | WO 95/32919 | 12/1995 | |
| WO | 97/09688 A3 | 3/1997 | |
| WO | WO 99/03057 A1 | 1/1999 | |
| WO | 99/49424 A1 | 9/1999 | |
| WO | WO 00/10144 A1 | 2/2000 | |
| WO | WO 00/38088 A1 | 6/2000 | |
| WO | 00/49586 A1 | 8/2000 | |
| WO | WO 01/04825 A1 | 1/2001 | |
| WO | WO 01/15098 A1 | 3/2001 | |
| WO | WO 01/43095 A2 | 6/2001 | |
| WO | WO 01/72224 A1 | 10/2001 | |
| WO | WO 01/77856 A1 | 10/2001 | |
| WO | WO 01/80473 A2 | 10/2001 | |
| WO | WO 01/86535 A2 | 11/2001 | |
| WO | WO 01/90962 A1 | 11/2001 | |
| WO | WO 01/95243 A2 | 12/2001 | |
| WO | WO 02/01485 A1 | 1/2002 | |
| WO | WO 02/13134 A2 | 2/2002 | |
| WO | WO 02/21903 A1 | 3/2002 | |
| WO | WO 02/063545 A2 | 8/2002 | |
| WO | WO 02/065246 A2 | 8/2002 | |
| WO | WO 02/065404 A2 | 8/2002 | |
| WO | WO 02/069221 A1 | 9/2002 | |
| WO | WO 02/073512 A1 | 9/2002 | |
| WO | WO 02/086665 A2 | 10/2002 | |
| WO | WO 02/091281 A2 | 11/2002 | |
| WO | WO 02/097575 A2 | 12/2002 | |
| WO | WO 02/101670 A2 | 12/2002 | |
| WO | 03/007623 A3 | 1/2003 | |

OTHER PUBLICATIONS http://www.palowireless.com/infotooth/whatis.asp, Apr. 28, 2003.
http://www.semiconductors.philips.com/news/content/file__878. html, Apr. 7, 2003.
International Search Report and Written Opinion of the International Searching Authority, PCT/US05/26101, May 13, 2008.
Kuntz, Mary, "Credit Cards as Good as Gold", Forbes, Nov. 4, 1985.
Lahey, Liam, "Microsoft Bolsters Rebate Structure", Computer Dealer News, Feb. 8, 2002.
Lamond, "Credit Card Transactions Real World and Online" © 1996.
Martin, Zack, One-Time Numbers Stop Web Hackers From Pilfering Data, Card Marketing, Thomson Financial, www.cardforum.com/html/cardmark/jan01__c3.htm, Jan. 2001.
Nyman, Judy, "Free Income Tax Clinics are Opening as Apr. 30 Deadline Draws Nearer", The Toronto Star, Final Edition, Mar. 25, 1986.
Obel, Michael, "Oil Companies Push Marketing, Cost Cutting to Fortify Earnings", Oil & Gas Journal, Sep. 16, 1985.
Schmuckler, Eric, "Playing Your Cards Right", Forbes, Dec. 28, 1987.
Sony, Philips to Test RFID Platform, RFID Journal, May 8, 2003, 2 pages.
"Core One Credit Union- Discover the Advantage", http://coreone.org/2visa.html, Copyright 2001, (Last Visited Oct. 9, 2002).
"What's New: Timex Watch Features Speedpass System", http://www.speedpass.com/news/article.jsp?id=51 (1 page).
"Physical Reality: A Second Look", Ken Sharp, Senior Technical Editor, http://www.idsystems.com/reader/1999__03/phys0399__pt2/phys0399__pt2.htm (6 pages).
"'Magic Wands' to Speed Mobile Sales", BobBrewin, Jan. 15, 2001, http://www.computerworld.com/mobiletopics/mobile/story/1,10801,563300.html (4 pages).
"Mobile Speedpass Goes Global as Mobil Singapore Rolls Out Asia's First RFID-Based Pay-At-The-Pump System", Press Release, Apr. 5, 1999, http://www.ti.com/tiris/docs/news__releases/rel12.htm (3 pages).
"Speedpass Unleashed", Jun. 4, 2002 http://www.cardweb.com/cardtrak/news/cf2__20a__97.html (2 pages).
Prophecy Central Update #9, Oct. 10, 1997, http://www.bible-prophecy.com/pcu9.htm (5 pages).
International Newsletter of the TI RFID Group, Issue 20, 2000 (12 pages).
"CES: Microsoft's SPOT Technology has Humble Origins", by James Niccolai, Jan. 10, 2003, http://archive.inforworld.com/articles/hn/xml/03/01/10/030110hnspot. xml?s=IDGNS (3 pages).
"Microsoft: See SPOT Run on Your Wrist", by Richard Shim, Jun. 5, 2003, http://news.com.com/2100-1041__3-1013442.html?tag=fd__top (1 page).

"Networking: Microsoft SPOT" by Jeremy A. Kaplan, Jul. 1, 2003, http://www.pcmag.com/print_article/0,3048,a=43561,00.asp (2 pages).
"Microsoft Launches Smart Personal Object Technology Initiative", Press Release from COMDEX Fall 2002, Nov. 17, 2002, http://www.Microsoft.com/presspass/features/2002/nov02/11-17SPOT.asp (4 pages).
"Bank Extends RFID Payment Pilot: Bank of America will continue to test its QuickWave RFID payment card for another three months", RFID Journal, Jan. 23, 2003.
"MasterCard to Test RFID Card: Pilot will test whether consumers, merchants and credit card issuers value "contactless" payments", RFID Journal, Dec. 20, 2002.
"Vendors Target Amusement Parks: Protecting children and enabling cashless payments make RFID an appealing option for the entertainment industry", RFID Journal, Nov. 27, 2002.
"Inside's Next-Gen Smart Card: The French company plans to introduce an RFID card that uses a 16-bit microprocessor and new encryption technology", RFID Journal, Oct. 29, 2002.
"Sony, Philips Creating RFID Link: Consumer electronics giants are jointly developing a new RFID standard for payments and for communication between devices", RFID Journal, Sep. 17, 2002.
"Japan Gets Digital Ticket System: A national ticket seller and phone company are teaming up to create an electronic ticket", RFID Journal, Aug. 31, 2002.
"Security for Wireless Java: NTRU, a startup that offers security software, has relased of Java version of its NTRU encryption algorithm", RFID Journal, Jun. 27, 2002.
"Making RFID Payments Ubiquitous: Philips and Visa want people to be able to pay for goods and services anywhere by using RFID chips embedded in the phones and other devices", RFID Journal, Jun. 2, 2003.
"RFID Smart Cards Gain Ground: The convenience of contactless transactions is driving widespread adoption of contactless smart cards", RFID Journal, Apr. 9, 2003.
"TI Embarces Prox Card Standard: Texas Instruments ISO 14443 payment platform promises faster data transfer rates and more security", RFID Journal, Mar. 6, 2003.
"Multiple Frequency Transponders: Volume production of dual-band RFID chips begins", Frontline Solutions, Jul. 16, 2003.
Functional Specification, Standard Card IC MF1 IC S50, Philips Semiconductors, Product Specification Rev. 5.1 May 2001.
"Biometrics: Speaker Verification", by Kulkarni, et al., http://biometrics.cse.msu.edu/speaker.html, Mar. 8, 2004, 5 pages.
"Judge Dismisses FTC Suit Against Rambus", Evers, IDG New Service, http://www.infoworld.com/article/04/02/18/HNjudgedismisses_1.html, Feb. 18, 2004, 3 pages.
"Credit on Your Key Ring, Buy Gas at Mobil, Exxon and Soon Burgers at McDonald's", by Krakow, MSNBC, http://www.msnbc.msn.com/id/3072638, Feb. 17, 2004, 4 pages.
"The Evolution of Mobile Payment", by McPherson, Financial Insights, Feb. 2, 2004, http://www.banktech.com./story/mews/showArticle/jhtml?article ID=17601432, 2 pages.
"RFID Take Priority With Wal-Mart", by DocMemory, http://www.simmtester.com/page/news/shownews.asp?num=6550, Feb. 9, 2004, 2 pages.
"Microsoft, IBM and Phillips Test RFID Technology", by Rohde, IDG New Service, http:www.computerweekly.com/Article127889.htm, Feb. 9, 2004, 3 pages.
"Pay by Touch Press Releases", http://www.paybytouch.com/press.html, Feb. 10, 2004, 3 pages.
"PowerPay RFID Payment and Marketing Solution Speeds Purchases at Seahawks Stadium with Technology from Texas Instruments", http://www.powerpayit.com/news/Seahawks_pr.html, Feb. 9, 2004, 2 pages.
"Putting Their Finger on It", by Wilson, http://sanfrancisco.bizjournals.com/sanfrancisco/stories/2003/10/20/story6.html?t=printable, Feb. 9, 2004, 2 pages.
"TI Embraces Prox Card Standard", by Roberti, Mar. 6, 2003, http://www.ti.com/tiris/docs/in-the-news/2003/3-6-03.shtml, 2 pages.
"Paying It by Ear", The Guardian, Jan. 18, 2003, http://money.guardian.co.uk/creditanddebt/creditcards/story/0,1456,876908,00.html, 3 pages.

Pay by Touch—Company, http://www.paybytouch.com/company.html.
"Identix Inc.—Empowering Identification™—Understanding Biometrics", http://www.identix.com/newsroom/news_biometrics_face.html, 1 page.
"International Biometric Group—Signature Biometrics: How It Works", http://www.ibgweb.com/reports/public/reports/signature-scan_tech.html, Feb. 18, 2004, 1 page.
"International Biometric Group—Voice Recognition Technology: How It Works", http://www.ibgweb.com/reports/public/reports/voice-scan_tech.html, Feb. 18, 2004, 1 page.
"The Henry Classification System", International Biometric Group, 7 pages.
"Individual Biometrics—Hand Geometry", http://ctl.ncsc.dni.us/biomet%20web/BMHand.html, Feb. 18, 2004, 2 pages.
"Individual Biometrics—Retinal Scan", http:ctl.ncsc.dni.us/biomet%20web/BMRetinal.html, Feb. 18, 2004, 2 pages.
"Individual Biometrics—Iris Scan", http:ctl.ncsc.dni.us/biomet%20web/BMIris.html, Feb. 18, 2004, 2 pages.
"Individual Biometrics—Vascular Patterns", http:ctl.ncsc.dni.us/biomet%20web/BMVascular.html, Feb. 18, 2004, 1 page.
"Individual Biometrics—Fingerprint", http:ctl.ncsc.dni.us/biomet%20web/BMFingerprint.html, Feb. 18, 2004, 3 pages.
"Fingerprint Technology—Indentix Inc.—Empowering Identification™—Understanding Biometrics", http://www.identix.com/newsroom/news_biometrics_finger.html, Feb. 18, 2004, 1 page.
"Individual Biometrics—Facial Recognition", http:ctl.ncsc.dni.us/biomet%20web/BMfacial.html, Feb. 18, 2004, 2 pages.
"Fingerprint Analysis—The Basics", http://www.crimtrac.gov.au/fingerprintanalysis.htm, Feb. 18, 2004, 3 pages.
"Visual Speech and Speaker Recognition", by Luettin, Jun. 30, 2000, http://herens.idiap.ch/~luettin/luettin-thesis.bib.abs.html, 1 page.
"Automatic Ear Recognition by Force Field Transformations", by Hurley, et al., The Institution of Electrical Engineers, 2000, pp. 7/1-7/5.
"Everything You Need to Know About Biometrics", by Bowman, Identix Croproation, Jan. 2000, 8 pages.
"How Fingerprint Scanners Work", by Harris, http:computer.howstuffworks.com/fingerprint-scanner.htm/printable, Feb. 18, 2004, 6 pages.
"How Facial Recognition Systems Work", by Bonsor, http://computer.howstuffworks.com/facial-recognition.htm/printable, Feb. 18, 2004, 6 pages.
"Biometrics: Hand Geometry", by Ross, et al., http://biometrics.cse.msu.edu/hand_geometry.html, Feb. 26, 2004, 2 pages.
"Biometric Person Authentication: Odor", by Korotkaya, Department of Information Technology, Laboratory of Applied Mathematics, Lappeenranta University of Technology, 18 pages.
"ISO Magnetic Stripe Card Standards", http://www.cyberd.co.uk/support./technotes/ioscards.htm, Feb. 9, 2004, 4 pages.
"Smart Card Developer's Kit: Some Basic Standards for Smart Cards", http:unix.be.eu.org/docs/smart-card-developer-kit/ch03/033-035.html, Feb. 9, 2004, 2 pages.
"Credit Card Offer Travelers New Benefit", PR Newswire, Aug. 5, 1987.
"New Evidence about Positive Three-Tier Co-pay Performance Presented at Express Scripts 2000 Outcomes Conference", PR Newswire Association, Inc., Jun. 28, 2000.
"Prestige Credit Cards: Those Pricey Plastics", Changing Times, Apr. 1986.
"Shell Introduces Optional Credit Card", The Associated Press, Sep. 3, 1985.
"Shell Introducing Expanded 'Signature' Credit Card", Tulsa Business Chronicle, Sep. 5, 1985.
"Shell-Oil: Introduces Shell Signature Travel and Entertainment Credit Card", Business Wire, Sep. 3, 1985.
"The Chase Manhattan Bank Today Announced a Comprehensive Program to Enhance the Value of All its Credit Cards", PR Newswire, Dec. 18, 1986.
American Express to offer disposable credit card numbers, CNN.com. U.S. News, www.cnn.com/2000/US/09/08/online.payments.ap/, Sep. 8, 2000.

American Express, Private Payments SM: A New Level of Security from American Express, American Express Website, Cards.

Carey, Gordon, "Multi-tier Copay", Pharmaceutical Executive, Feb. 2000.

Crumbaugh, Darlene M., "Effective Marketing Positions: Check card as consumer lifeline", Hoosier Banker, Apr. 1998, p. 10, vol. 82, Issue 4.

Disposable Credit Card Numbers, courtesy of CardRatings.org, The Dollar Stretcher, www.stretcher.com/stories/01/010212e.cfm, Jan. 2001.

Gabber, et al., "Agora: A Minimal Distributed Protocol for Electronic Commerce", USENIX Oakland, CA, Nov. 18, 1996.

Goldwasser, Joan, "Best of the Cash-back Cards", Kiplinger's Personal Finance Magazine, Apr. 1999.

Greene, Thomas C., American Express offers temporary CC Numbers for the Web, The Register, www.theregister.com.uk/content/1/13132.html, Sep. 9, 2000.

http://www.palowireless.com/infotooth/tutorial.asp, Apr. 28, 2003.

http://www.palowireless.com/infotooth/tutorial/l2cap.asp, Apr. 28, 2003.

http://www.palowireless.com/infotooth/tutorial/baseband.asp, Apr. 28, 2003.

http://www.palowireless.com/infotooth/tutorial/hci.asp, Apr. 28, 2003.

http://www.palowireless.com/infotooth/tutorial/lmp.asp, Apr. 28, 2003.

http://www.palowireless.com/infotooth/tutorial/k1_gap.asp, Apr. 28, 2003.

http://www.palowireless.com/infotooth/tutorial/profiles.asp, Apr. 28, 2003.

http://www.palowireless.com/infotooth/tutorial/radio.asp, Apr. 28, 2003.

http://www.palowireless.com/infotooth/tutorial/rfcomm.asp, Apr. 28, 2003.

http://www.palowireless.com/infotooth/tutorial/sdp.asp, Apr. 28, 2003.

* cited by examiner

*MasterCard Track Layout in Track 2*

| SS | PAN | FS | ADDITIONAL DATA | ES | LRC |
|----|-----|-----|-----------------|-----|-----|
| ; | 3111222233334444 | = | 9912101000000000 | ? | |

FIG. 6

| Field Name | Type | Max Length | Description |
|---|---|---|---|
| TRVLYLTY | 'C' | varies | Travel Partner-specific loyalty number (Frequent Flyer, Stayer, Renter, etc.) |
| PIN | 'C' | varies | Travel Partner-specific PIN associated with above loyalty number (Frequent Flyer, Stayer, Renter, etc.) |
| LASTNAME | 'C' | 30 | Last Name |
| FIRSTNAME | 'C' | 20 | First Name |
| MIDNAME | 'C' | 8 | Middle Name (or initial) |
| HONTITLE | 'C' | 8 | Honorary Title (Mr, Mrs, Ms, Dr, etc.) |
| NAMESUFIX | 'C' | 4 | Name Suffix (Jr, Sr, etc.) |
| COMPNAME | 'C' | 30 | Company Name |
| HOMEADDRE1 | 'C' | 40 | Home Address Line 1 |
| HOMEADDRE2 | 'C' | 40 | Home Address Line 2 |
| HOMEADDRE3 | 'C' | 40 | Home Address Line 3 |
| HOMECITY | 'C' | 25 | Home City |
| HOMESTATE | 'C' | 5 | Home State |
| HOMECOUNTR | 'C' | 2 | Home Country |
| HOMEZIP | 'C' | 10 | Home ZIP CODE (12345-1234) |
| HOMEPHONE | 'C' | 20 | Home Phone (No Punctuation; Numbers only; 7129991023) |
| HOMEFAX | 'C' | 20 | Home Fax; (No Punctuation; Numbers only; 7129991023) |
| HOMEEMAIL | 'C' | 40 | Home Email Address |
| BUSADDRES1 | 'C' | 40 | Business Addres Line 1 |
| BUSADDRES2 | 'C' | 40 | Business Addres Line 2 |
| BUSADDRES3 | 'C' | 40 | Business Addres Line 3 |
| BUSCITY | 'C' | 25 | Business City |
| BUSSTATE | 'C' | 5 | Business State |
| BUSCOUNTRY | 'C' | 2 | Business Country |
| BUSZIP | 'C' | 10 | Business ZIP code (12345-1234) |

FIG. 7

SYSTEM AND METHOD FOR DYNAMIC FOB SYNCHRONIZATION AND PERSONALIZATION

CROSS REFERENCE TO RELATED APPLICATIONS

This invention may be a continuation in part of U.S. Ser. No. 10/340,352, filed on Jan. 10, 2003, and entitled "SYSTEM AND METHOD FOR INCENTING PAYMENT USING RADIO FREQUENCY IDENTIFICATION IN CONTACT AND CONTACTLESS TRANSACTIONS." The '352 application itself claims priority to U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," filed on Jul. 9, 2002 (which itself claims priority to U.S. Provisional No. 60/304,216, filed on Jul. 10, 2001); U.S. patent application Ser. No. 10/318,432, entitled "SYSTEM AND METHOD FOR SELECTING LOAD OPTIONS FOR USE IN RADIO FREQUENCY IDENTIFICATION IN CONTACT AND CONTACTLESS TRANSACTIONS," filed Dec. 13, 2002; U.S. patent application Ser. No. 10/318,480, entitled "SYSTEM AND METHOD FOR PAYMENT USING RADIO FREQUENCY IDENTIFICATION IN CONTACT AND CONTACTLESS TRANSACTIONS," filed Dec. 13, 2002; and, U.S. Provisional Patent Application No. 60/396,577, filed Jul. 16, 2002. All of the above applications are hereby incorporated by reference.

FIELD OF INVENTION

The present invention relates generally to the use of Radio Frequency Identification (RFID) in contactless environments for commercial transactions and, more particularly, to a method and system to facilitate dynamic synchronization and personalization of fob information in the context of a distributed transaction system.

BACKGROUND OF INVENTION

Like barcode and voice data entry, RFID is a contactless information acquisition technology. RFID systems are wireless, and are usually extremely effective in hostile environments where conventional acquisition methods fail. RFID has established itself in a wide range of markets, such as, for example, the high-speed reading of railway containers, tracking moving objects such as livestock or automobiles, and retail inventory applications. As such, RFID technology has become a primary focus in automated data collection, identification and analysis systems worldwide.

Of late, companies are increasingly embodying RFID data acquisition technology in a fob or tag for use in completing financial transactions. A typical fob may include a transponder and is ordinarily a self-contained device which may be contained on any portable form factor. In some instances, a battery may be included with the fob to power the transponder, in which case the internal circuitry of the fob (including the transponder) may draw its operating power from the battery power source. Alternatively, the fob may exist independent of an internal power source. In this instance the internal circuitry of the fob (including the transponder) may gain its operating power directly from a RF interrogation signal. U.S. Pat. No. 5,053,774, issued to Schuermann, describes a typical transponder RF interrogation system which may be found in the prior art. The Schuermann patent describes in general the powering technology surrounding conventional transponder structures. U.S. Pat. No. 4,739,328 discusses a method by which a conventional transponder may respond to a RF interrogation signal. Other typical modulation techniques which may be used include, for example, ISO/IEC 14443 and the like.

In the conventional fob powering technologies used, the fob is typically activated upon presenting the fob in an interrogation signal. In this regard, the fob may be activated irrespective of whether the user desires such activation. Inadvertent presentation of the fob may result in initiation and completion of an unwanted transaction. Thus, a fob system is needed which allows the fob user to control activation of the fob to limit transactions being undesirably completed.

One of the more visible uses of the RFID technology is found in the introduction of Exxon/Mobil's Speedpass® and Shell's EasyPay® products. These products use transponders placed in a fob or tag which enables automatic identification of the user when the fob is presented at a Point-of-sale (POS) device. Fob identification data is typically passed to a third party server database, where the identification data is referenced to a customer (e.g., user) credit or debit account. In an exemplary processing method, the server seeks authorization for the transaction by passing the transaction and account data to an authorizing entity. Once the server receives authorization, clearance is sent to the POS device for completion of the transaction. In this way, the conventional transaction processing method involves an indirect path which causes undue overhead due to the use of the third-party server.

It is desirable to maintain, for each fob held by a consumer, a substantially accurate history of transaction information and applications associated with the fob. Presently known systems are typically inadequate in this regard in that they do not provide efficient and reliable methods for ensuring synchronization between information stored on the fob and corresponding information stored on one or more external databases. As a result, present systems fail to ensure that lost or stolen fobs may be reissued or replaced with up-to-date information.

Moreover, present systems are inadequate in that the systems often do not allow an enterprise, such as a fob corporate partner (for example, Hertz, Hilton and the like) to dynamically add to or otherwise modify the fob application structure itself. That is, in the context of multifunction fobs, it is often infeasible to alter or augment the fob's file structure without engaging in the time-consuming and costly process of re-issuing the fob.

Furthermore, known methods of issuing and re-issuing fobs in a multi-application, multi-enterprise environment are typically inadequate. More particularly, a fob often contains a number of different applications associated with a wide range of enterprise organizations. For security purposes, the writing, updating, and reading of these files is advantageously restricted to particular parties in accordance with a set of access condition rules. These access conditions may be suitably implemented using cryptographic keys which are known only to the appropriate parties, such as the enterprise. Thus, a fob issuing party such as American Express will typically not have access to the keys to perform its function. Some of the known systems have attempted to solve this problem by accumulating key data in a central repository used in the issuance process. This method is often unsatisfactory in a number of respects. Most notably, a security breach in the central repository of key information may have disastrous consequences.

Techniques are therefore needed to overcome these and other limitations of the prior art. More specifically, systems are needed to provide secure and efficient personalization and dynamic synchronization of multi-function fobs.

SUMMARY OF INVENTION

The present invention overcomes the limitations of the prior art by providing a system and method for personalizing and synchronizing fob data in the context of a distributed transaction system.

In accordance with one aspect of the present invention, a dynamic fob synchronization system may comprise POS devices configured to initiate a transaction in conjunction with a fob, an enterprise data collection unit, and a fob object database update system. An exemplary dynamic synchronization system (DSS) may comprise various fob POS devices a secure support client server, a fob object database update system (FODUS), one or more enterprise data synchronization interfaces (EDSIs), an update logic system, one or more enterprise data collection units (EDCUs), and one or more point-of-sale (POS) devices configured to interoperably accept and interface with fobs. In an exemplary embodiment, DSS may comprise a personalization system and an account maintenance system configured to communicate with FODUS.

In accordance with a further aspect of the present invention, personalization of multi-function fobs is accomplished using a security server configured to generate and/or retrieve cryptographic key information from multiple enterprise key systems during the final phase of the fob issuance process.

BRIEF DESCRIPTION OF DRAWINGS

The accompanying drawings, wherein like numerals depict like elements, illustrate exemplary embodiments of the present invention, and together with the description, serve to explain the principles of the invention. In the drawings:

FIG. 6 is an example of a conventional magnetic stripe track 2 layout for MasterCard;

FIG. 7 is an exemplary transaction data structure suitable for use in a travel context;

DETAILED DESCRIPTION

The present invention may be described herein in terms of functional block components, screen shots, optional selections and various processing steps. Such functional blocks may be realized by any number of hardware and/or software components configured to perform specified functions. For example, the present invention may employ various integrated circuit components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), JavaFob and MULTOS with the various algorithms being implemented with any combination of data structures, objects, processes, routines or other programming elements. Further, it should be noted that the present invention may employ any number of conventional techniques for data transmission, signaling, data processing, network control, and the like. For a basic introduction on cryptography, review a text written by Bruce Schneier entitled "Applied Cryptography: Protocols, Algorithms, and Source Code in C," published by John Wiley & Sons (second edition, 1996), herein incorporated by reference.

In addition, many applications of the present invention could be formulated. The exemplary network disclosed herein may include any system for exchanging data or transacting business, such as the Internet, an intranet, an extranet, WAN, LAN, satellite communications, and/or the like. It may be noted that the network may be implemented as other types of networks, such as an interactive television network (ITN).

Where required, the system user may interact with the system via any input device such as, a keypad, keyboard, mouse, kiosk, personal digital assistant, handheld computer (e.g., Palm Pilot®, Blueberry®), cellular phone and/or the like. Similarly, the invention could be used in conjunction with any type of personal computer, network computer, work station, minicomputer, mainframe, or the like running any operating system such as any version of Windows, Windows NT, Windows 2000, Windows 98, Windows 95, MacOS, OS/2, BeOS, Linux, UNIX, Solaris or the like. Moreover, although the invention may frequently be described as being implemented with TCP/IP communications protocol, it should be understood that the invention could also be implemented using SNA, IPX, Appletalk, IPte, NetBIOS, OSI or any number of communications protocols. Moreover, the system contemplates, the use, sale, or distribution of any goods, services or information over any network having similar functionality described herein.

Figure 1:
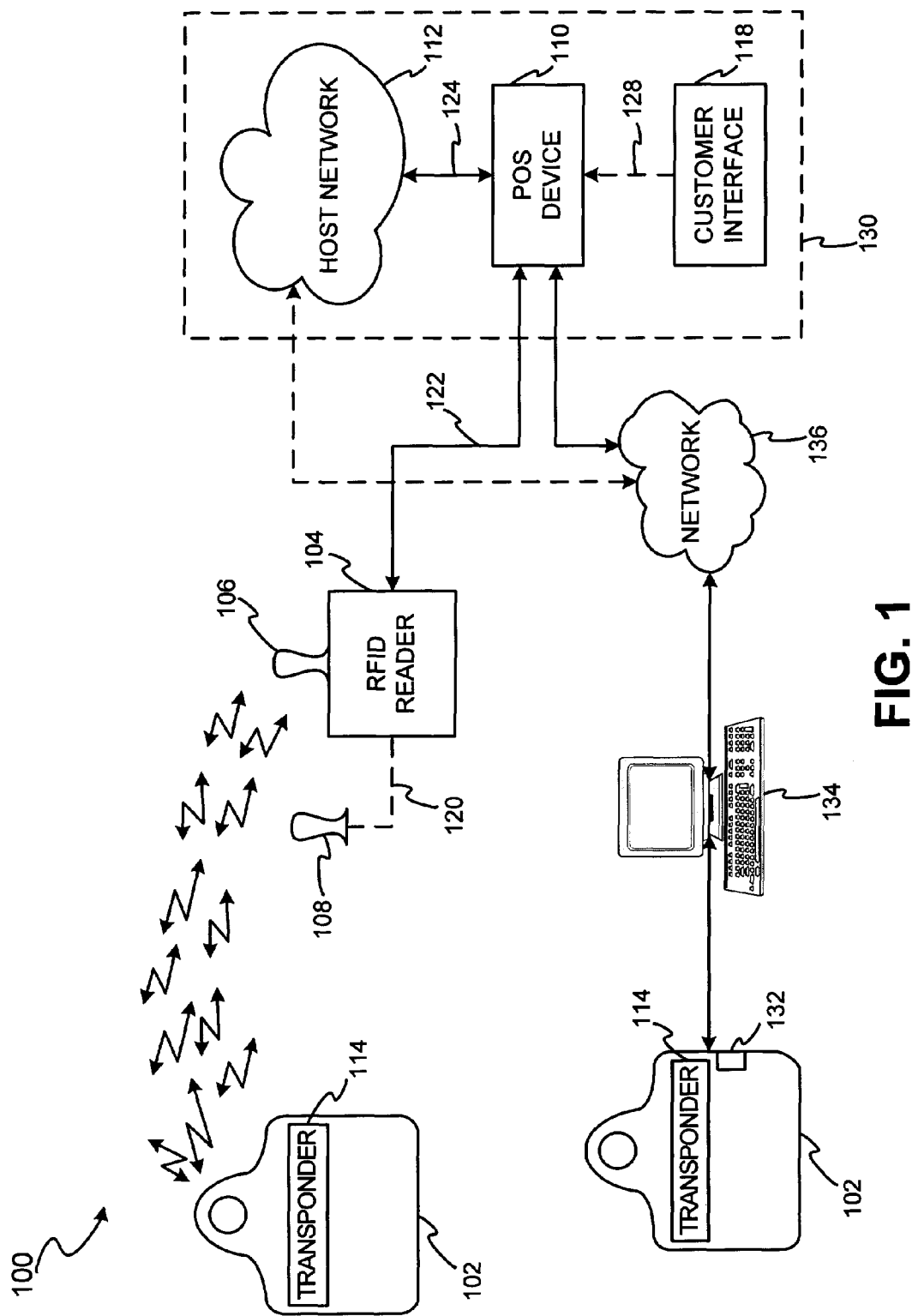
FIG. 1 illustrates an exemplary RFID-based system in accordance with the present invention, wherein exemplary components used for fob transaction completion are depicted.

FIG. 1 illustrates an exemplary RFID transaction system 100 in accordance with the present invention, wherein exemplary components for use in completing a fob transaction using travel-related information are depicted. In general, the operation of system 100 may begin when fob 102 may be presented for payment, and may be interrogated by RFID reader 104 or, alternatively, interface 134. Fob 102 and RFID reader 104 may then engage in mutual authentication after which the fob 102 may provide the transponder identification, account identifier and/or travel-related information to the RFID reader 104 which may further provide the information to the merchant system 130 POS device 110.

System 100 may include a fob 102 having a transponder 114 and a RFID reader 104 in RF communication with fob 102. Although the present invention may be described with respect to a fob 102, the invention may be not to be so limited. Indeed, system 100 may include any device having a transponder which may be configured to communicate with a RFID reader 104 via RF communication. Typical devices may include, for example, a key ring, tag, fob, cell phone, wristwatch or any such form capable of being presented for interrogation.

RFID reader 104 may be configured to communicate using a RFID internal antenna 106. Alternatively, RFID reader 104 may include an external antenna 108 for communications with fob 102, where the external antenna may be made remote to RFID reader 104 using a suitable cable and/or data link 120. RFID reader 104 may be further in communication with a merchant system 130 via a data link 122. System 100 may include a transaction completion system including a point of interaction device such as, for example, a merchant point-of-sale (POS) device 110 or a computer interface (e.g., user interface) 134. In one exemplary embodiment the transaction completion system may include a merchant system 130 including POS device 110 in communication with RFID reader 104 (via data link 122). As described more fully below, the trans-n action completion system may include user interface 134 connected to a network 136 and to the transponder via a USB connector 132.

Although the point of interaction device may be described herein with respect to a merchant point-of-sale (POS) device, the invention may be not to be so limited. Indeed, a merchant POS device may be used herein by way of example, and the point of interaction device may be any device capable of receiving fob account data. In this regard, the POS may be any point of interaction device enabling the user to complete a transaction using fob 102. POS device 110 may be in further communication with a customer interface 118 (via data link 128) for entering customer identity verification information. In addition, POS device 110 may be in communication with merchant host network 112 (via data link 124), an issuer host network, and/or any other access point for processing any transaction request. In this arrangement, information provided by RFID reader 104 may be provided to POS device 110 of merchant system 130 via data link 122. POS device 110 may receive the information (and alternatively may receive any identity verifying information from customer interface 118 via data link 128) and provide the information to host system 112 for processing.

A variety of conventional communications media and protocols may be used for data links 120, 122, 124, and 128. For example, data links 120, 122, 124, and 128 may be an Internet Service Provider (ISP) configured to facilitate communications over a local loop as may be typically used in connection with standard modem communication, cable modem, dish networks, ISDN, Digital Subscriber Lines (DSL), or any wireless communication media. In addition, the merchant system 130 including POS device 110 and host network 112 may reside on a local area network which interfaces to a remote network (not shown) for remote authorization of an intended transaction. The merchant system 130 may communicate with the remote network via a leased line, such as a T1, D3 line, or the like. Such communications lines are described in a variety of texts, such as, "Understanding Data Communications," by Gilbert Held, which may be incorporated herein by reference.

An account number, as used herein, may include any identifier for an account (e.g., credit, charge debit, checking, savings, reward, loyalty, travel or the like) which may be maintained by a transaction account provider (e.g., payment authorization center) and which may be used to complete a financial transaction. A typical account number (e.g., account data) may be correlated to a credit or debit account, loyalty account, travel or rewards account maintained and serviced by such entities as American Express, Visa and/or MasterCard, or the like. For ease in understanding, the present invention may be described with respect to a credit card account. However, it should be noted that the invention may be not so limited and other accounts permitting an exchange of goods and services for an account data value may be contemplated to be within the scope of the present invention.

In addition, the account number (e.g., account data) may be associated with any device, code, or other identifier/indicia suitably configured to allow the consumer to interact or communicate with the system, such as, for example, authorization/access code, personal identification number (PIN), Internet code, digital certificate, biometric data, and/or other identification indicia. The account number may be optionally located on a rewards card, charge card, credit card, debit card, prepaid card, telephone card, smart card, magnetic stripe card, bar code card, and/or the like. The account number may be distributed and stored in any form of plastic, electronic, magnetic, and/or optical device capable of transmitting or downloading data to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". In a typical example, the first five to seven digits are reserved for processing purposes and identify the issuing bank, card type and etc. In this example, the last sixteenth digit may be used as a sum check for the sixteen-digit number. The intermediary eight-to-ten digits are used to uniquely identify the customer. The account number stored as Track 1 and Track 2 data as defined in ISO/IEC 7813, and further may be made unique to fob 102. Track 1 and Track 2 data may be described in more detail below. In one exemplary embodiment, the account number may include a unique fob serial number and user identification number, as well as specific application applets. The account number may be stored in fob 102 inside a database 214, as described more fully below. Database 214 may be configured to store multiple account numbers issued to fob 102 user by the same or different account providing institutions. Where the account data corresponds to a loyalty or rewards account, database 214 may be configured to store the attendant loyalty or rewards points data.

Figure 2:
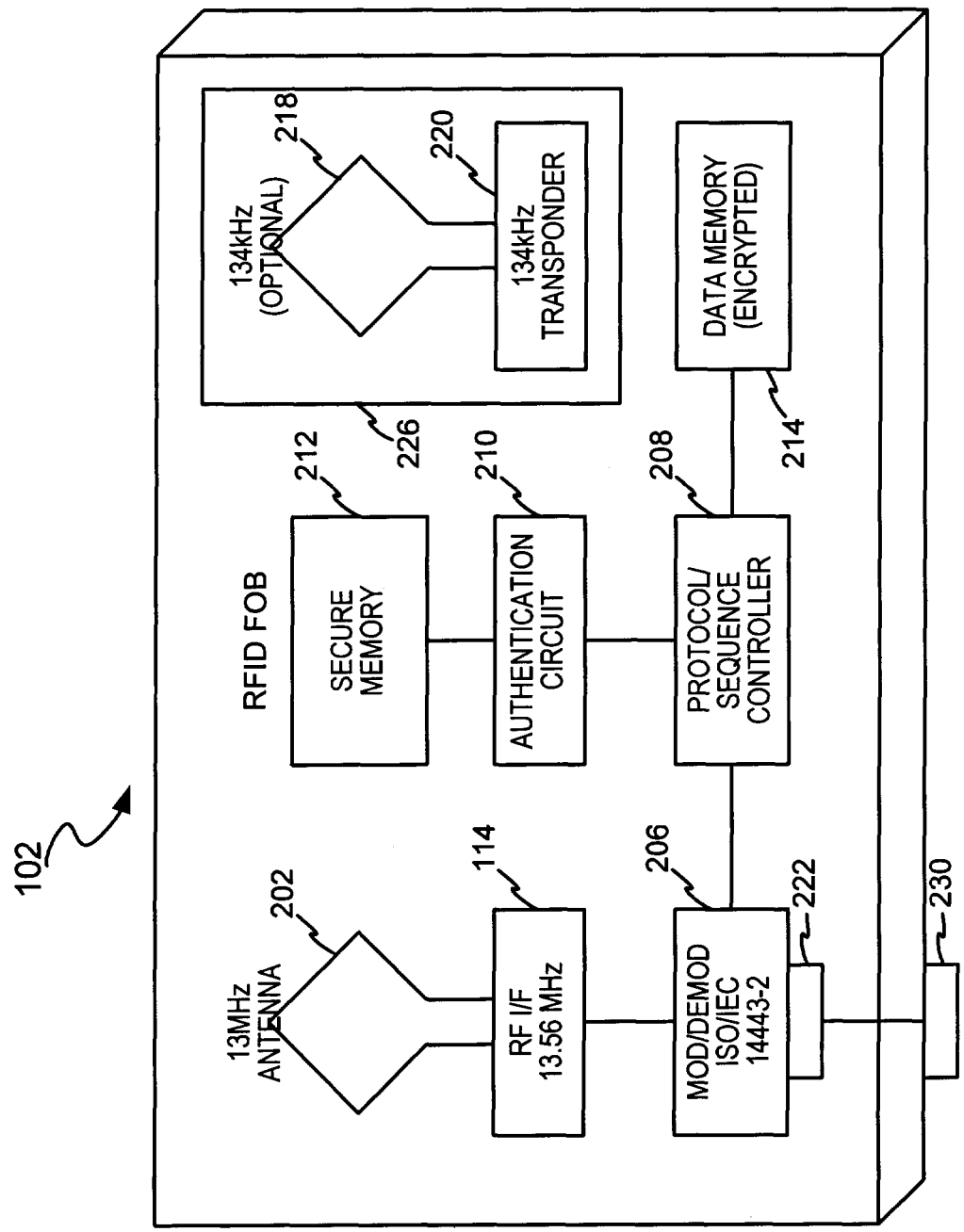
FIG. 2 is a schematic illustration of an exemplary fob in accordance with the present invention.

FIG. 2 illustrates a block diagram of the many functional blocks of exemplary fob 102 in accordance with the present invention. Fob 102 may be an RFID fob 102 which may be presented by the user to facilitate an exchange of funds or points, etc., for receipt of goods or services. As described herein, by way of example, fob 102 may be an RFID fob which may be presented for facilitating payment for goods and/or services.

Fob 102 may include an antenna 202 for receiving an interrogation signal from RFID reader 104 via antenna 106

(or alternatively, via external antenna 108). Fob antenna 202 may be in communication with a transponder 114. In one exemplary embodiment, transponder 114 may be a 13.56 MHz transponder compliant with the ISO/IEC 14443 standard, and antenna 202 may be of the 13 MHz variety. Transponder 114 may be in communication with a transponder compatible modulator/demodulator 206 configured to receive the signal from transponder 114 and configured to modulate the signal into a format readable by any later connected circuitry. Further, modulator/demodulator 206 may be configured to format (e.g., demodulate) a signal received from the later connected circuitry in a format compatible with transponder 114 for transmitting to RFID reader 104 via antenna 202. For example, where transponder 114 may be of the 13.56 MHz variety, modulator/demodulator 206 may be ISO/IEC 14443-2 compliant.

Modulator/demodulator 206 may be coupled to a protocol/sequence controller 208 for facilitating control of the authentication of the signal provided by RFID reader 104, and for facilitating control of the sending of fob 102 account number. In this regard, protocol/sequence controller 208 may be any suitable digital or logic driven circuitry capable of facilitating determination of the sequence of operation for fob 102 inner-circuitry. For example, protocol/sequence controller 208 may be configured to determine whether the signal provided by RFID reader 104 may be authenticated, and thereby providing to RFID reader 104 the account number stored on fob 102.

Protocol/sequence controller 208 may be further in communication with authentication circuitry 210 for facilitating authentication of the signal provided by RFID reader 104. Authentication circuitry may be further in communication with a non-volatile secure memory database 212. Secure memory database 212 may be any suitable elementary file system such as that defined by ISO/IEC 7816-4 or any other elementary file system allowing a lookup of data to be interpreted by the application on the chip. Database 212 may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables may be, in one embodiment, the same. However, data tables having similar, though not identical, data in the key fields may also be merged by using AGREP, for example.

The data may be used by protocol/sequence controller 208 for data analysis and used for management and control purposes, as well as security purposes. Authentication circuitry may authenticate the signal provided by RFID reader 104 by association of the RFID signal to authentication keys stored on database 212. Encryption circuitry may use keys stored on database 212 to perform encryption and/or decryption of signals sent to or from RFID reader 104.

In addition, protocol/sequence controller 208 may be in communication with a database 214 for storing at least fob 102 account data, and a unique fob 102 identification code. Protocol/sequence controller 208 may be configured to retrieve the account number from database 214 as desired. Database 214 may be of the same configuration as database 212 described above. The fob account data and/or unique fob identification code stored on database 214 may be encrypted prior to storage. Thus, where protocol/sequence controller 208 retrieves the account data, and or unique fob identification code from database 214, the account number may be encrypted when being provided to RFID reader 104. Further, the data stored on database 214 may include, for example, an unencrypted unique fob 102 identification code, a user identification, Track 1 and 2 data, as well as specific application applets.

In accordance with another exemplary embodiment, the account number may be stored in magnetic stripe format. For example, where the account number may be in magnetic stripe format, the International Standards Organization ISO/IEC 7811, et al. standard, governs the account number portions which are hereby incorporated by reference. The standard requires the magnetic stripe information to be encoded in three "tracks" (i.e., track 1, track 2, and track 3).

Data stored in track 1 may be typically used to verify the user's identity. Track 1 may be reserved for encoding the transaction account identifier, the name of the accountholder, and at least the expiration date of the transaction account or the transaction device. The information encoded in track 1 may be alpha-numeric and may be encoded at about 7 Bits/Character. In an exemplary layout of the data stored in track 1, track 1 may be segmented into several distinct predetermined portions (e.g., "fields") for encoding the various account identifying information. The following table may be useful for determining the field definitions of the information provided.

TABLE 1

Table of Field Codes for Track 1

Figure 8:
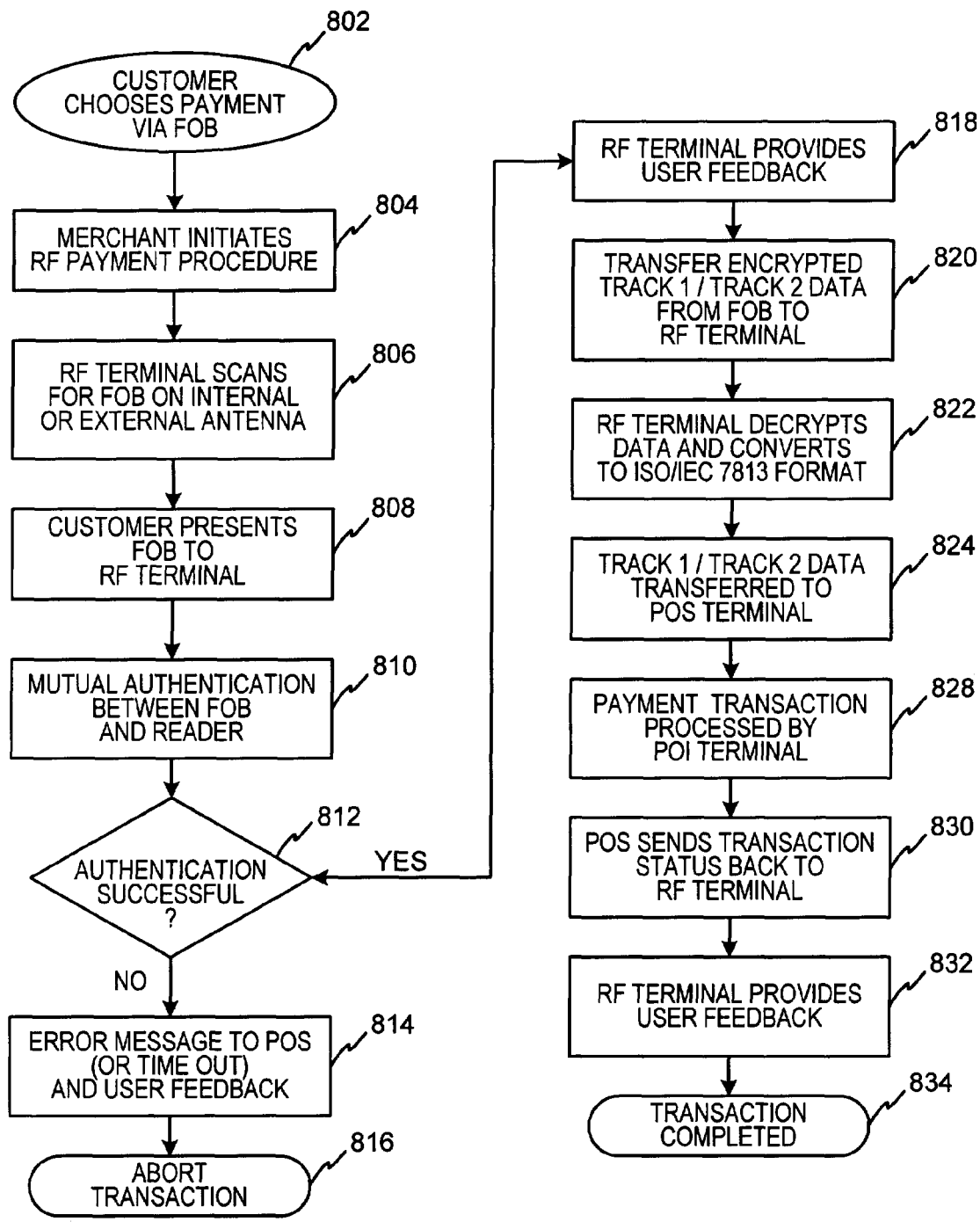
FIG. 8 is a flow diagram of an exemplary payment/transaction process in accordance with the present invention.

SS = Start Sentinel "%"
FC = Format Code
PAN = Primary Acct. # (19 digits max)
FS = Field Separator " "
Name = 26 alphanumeric characters max.
Additional Data = Expiration Date, offset, encrypted PIN, etc.
ES = End Sentinel "?"
LRC = Longitudinal Redundancy Check Track 2 may be the track most commonly used by the American Banking Association associated banking institutions. Track 2 may be typically reserved for a duplicate version of the transaction account identifier and the expiration date of the transaction account or the transaction device stored in track 1. In addition, track 2 may include an encrypted Personal Identification Code, and other discretionary data. However, the data in track 2 may be encoded at a lower Bit per Character density than the data encoded in track 1. The data in track 2 may be numeric only and may be encoded at about 5 Bits/Character. The lower density ratio in track 2 may be designed to ensure compatibility with older technology readers and to provide redundancy when reading with newer technology readers. FIG. 8 illustrates an exemplary layout of the data stored in track 2, wherein track 2 may be segmented into several distinct predetermined portions for encoding the various account identifying information. As shown, the following table may be useful for determining the definitions of the information provided.

TABLE 2

Table of Field Codes for Track 2

SS = Start Sentinel "%"
SS = Start Sentinel ";"
PAN = Primary Acct. # (19 digits max)
FS = Field Separator "="
Additional Data = Expiration Date, offset, encrypted PIN, etc.
ES = End Sentinel "?"
LRC = Longitudinal Redundancy Check Track 3 may be of similar description as Track 2. With the International Standards Organization adoption of standard ISO/IEC 4909, track 3 of the magnetic stripe format was no longer used by the banking industry. However, other transaction devices including a magnetic stripe, such as drivers licenses, use track 3, which may include both numeric only and alpha numeric characters. Track 3 may be unique in that track 3 was intended to have data read and WRITTEN on it. Fob users may have account information UPDATED right on the magnetic stripe. The present invention anticipates that a fob user's travel-related information profile and/or account information may be updated using track 3. Unfortunately, track 3 may be almost an orphaned standard, since most readers currently in operation are not configured to write data onto a magnetic stripe. The original design of track 3 was to control offline ATM transactions by recording transaction data for later reference by the banking institution. But since ATMs are now on-line, the usage of track 3 has been drastically reduced.

The most common technique used to encode data in magnetic stripe format may be known as Aiken Biphase, or "two-frequency coherent-phase encoding." The American National Standards Institute (ANSI) and the International Standards Organization (ISO) have chosen two standards to guide the encoding process. The ISO encoding protocol specifies that each of tracks 1, 2 and 3 must begin and end with a length of all Zero bits, called CLOCKING BITS. These are used to synch the self-clocking feature of bi-phase decoding. In addition, most transaction devices which use magnetic stripe encoding protocol use either the ANSI/ISO ALPHA Data format or the ANSI/ISO BCD Data format. For example, track 1 may be typically encoded in ANSI/ISO ALPHA Data format which may be a 7 bit, 6 data bits+1 parity bit (odd) format, where the data may be read least significant bit first. The ANSI/ISO ALPHA format character set contains 64 characters, 43 alphanumeric, 3 framing/field characters and 18 control/special characters. On the other hand, tracks 2 and 3 are typically encoded in ANSI/ISO BCD Data format, which may be a 5 bit, 4 data bits+1 parity bit (odd) format. The character set for the ANSI/ISO BCD Data format character set contains 16 characters, 10 alphanumeric, 3 framing/field characters and 3 control/special characters.

Ordinarily, a proxy account number (e.g., a portion of the transaction account number) includes essential identifying information, such as, for example, any information that may be common to the account provider. The common information (also called "common character," herein) may include the account provider routing number, or common source indicator such as the character spaces reserved to indicate the identification of the issuing bank. Thus, where the proxy transaction account identifier corresponds to an American Express account, the proxy transaction account identifier may include the common character number 3, encoded the field location where such common character may be ordinarily encoded in traditional magnetic stripe format.

FIG. 6 illustrates the encoding of which may ordinarily be done by an entity, such as, for example, MasterCard in track 2 format. FIG. 6 shows the encoding of a MasterCard account number 3111 2222 3333 4444 with expiration date 12/99 in traditional track 1 format. Since MasterCard uses the number 3 to identify its transaction accounts, the proxy account identifier will also use the number 3 so that the receiving system (e.g., reader 104 or merchant system 130, or account provider) further recognizes that the proxy account identifier may be from a MasterCard transaction device. It should be noted that in this example, the "3" and the "101" may be common characters to all MasterCard transaction accounts. For a more detailed explanation of magnetic stripe format data exchange, see U.S. patent application Ser. No. 10/810, 473, filed on Mar. 26, 2004, entitled "SYSTEM AND METHOD FOR ENCODING INFORMATION IN MAGNETIC STRIPE FORMAT FOR USE IN RADIO FREQUENCY IDENTIFICATION TRANSACTIONS," incorporated herein by reference.

Fob 102 may be configured to respond to multiple interrogation frequency transmissions provided by RFID reader 104. That may be, as described more fully below, RFID reader 104 may provide more than one RF interrogation signal. In this case, fob 102 may be configured to respond to the multiple frequencies by including in fob 102 one or more additional RF signal receiving/transmitting units 226. RF signal receiving/transmitting unit 226 may include an antenna 218 and transponder 220 where the antenna 218 and transponder 220 are compatible with at least one of the additional RF signals provided by RFID reader 104. For example, in one exemplary embodiment, fob 102 may include a 134 kHz antenna 218 configured to communicate with a 134 kHz transponder 220. In this exemplary configuration, an ISO/IEC 14443-2 compliant modulator/demodulator may not be required. Instead, the 134 kHz transponder may be configured to communicate directly with the protocol/sequence controller 208 for transmission and receipt of authentication and account number signals as described above.

In another embodiment, fob 102 may further include a universal serial bus (USB) connector 132 for interfacing fob 102 to a user interface 134. User interface 134 may be further in communication with a POS device 110 via a network 136. Network 136 may be the Internet, an intranet, or the like as may be described above with respect to network 112. Further, user interface 134 may be similar in construction to any conventional input devices and/or computing systems aforementioned for permitting the system user to interact with the system. In one exemplary embodiment, fob 102 may be configured to facilitate online Internet payments. A USB converter 222 may be in communication with a USB connector 132 for facilitating the transfer of information between the modulator/demodulator 206 and USB connector 132. Alternatively, USB converter 222 may be in communication with protocol/sequence controller 208 to facilitate the transfer of information between protocol/sequence controller 208 and USB connector 132.

Where fob 102 includes a USB connector 132, fob 102 may be in communication with, for example, a USB port on user interface 134. The information retrieved from fob 102 may be compatible with credit card and/or smart card technology enabling usage of interactive applications on the Internet. No RFID reader may be required in this embodiment since the connection to POS device 110 may be made using a USB port on user interface 134 and a network 136.

Fob 102 may include means for enabling activation of the fob by the user. In one exemplary embodiment, a switch 230 which may be operated by the user of fob 102. The switch 230 on fob 102 may be used to selectively or inclusively activate fob 102 for particular uses. In this context, the term "selectively" may mean that the switch 230 enables the user to place fob 102 in a particular operational mode. For example, the user may place fob 102 in a mode for enabling purchase of a good or of a service using a selected account number. Alternatively, the fob may be placed in a mode as such that the fob account number may be provided by USB port 132 (or serial port) only and the fob transponder 114 may be disabled. In addition, the term "inclusively" may mean that fob 102 may be placed in an operational mode permitting fob 102 to be responsive to the RF interrogation and interrogation via the USB connector 132. In one particular embodiment, the switch 230 may remain in an OFF position ensuring that one or more applications or accounts associated with fob 102 are non-reactive to any commands issued by RFID reader 104. As used herein, the OFF position may be termed the "normal" position of the activation switch 230, although other normal positions are contemplated.

In another exemplary embodiment, when the switch 230 may be moved from the OFF position, fob 102 may be deemed activated by the user. That may be, the switch 230 may activate internal circuitry in fob 102 for permitting the fob to be responsive to RF signals (e.g., commands from RFID reader 104). In this way, switch 230 may facilitate control of the active and inactive states of fob 102. Such control increases the system security by preventing inadvertent or illegal use of fob 102.

In one exemplary embodiment, switch 230 may be a simple mechanical device in communication with circuitry which may electrically prevent the fob from being powered by a RFID reader. That may be, when switch 230 may be in its normal position, switch 230 may provide a short to fob 102 internal circuitry, preventing fob 102 from being responsive to interrogation by RF or via the USB connector 230. In this arrangement, the switch 230 may be, for example, a "normally closed" (NC) configured switch, which may be electrically connected to the antenna 202 at the interface of the antenna 202 and the transponder 114. The switch 230 may be depressed, which may open the switch 230 fully activating the antenna 202.

In yet another exemplary embodiment, fob 102 may include a biometric sensor and biometric membrane configured to operate as switch 230 and activate fob 102 when provided biometric signal from fob 102 user. Such biometric signal may be the digital reading of a fingerprint, thumbprint, or the like. Typically, where biometric circuitry may be used, the biometric circuitry may be powered by an internal voltage source (e.g., battery). In this case, the switch may not be a simple mechanical device, but a switch which may be powered. In yet another exemplary embodiment, switch 230 may be battery powered though no biometric circuitry may be present in fob 102.

In yet another embodiment, the switch 230 may be a logic switch. Where switch 230 may be a logic switch the switch 230 control software may be read from the sequence controller 208 to selectively control the activation of the various fob 102 components.

Figure 3:
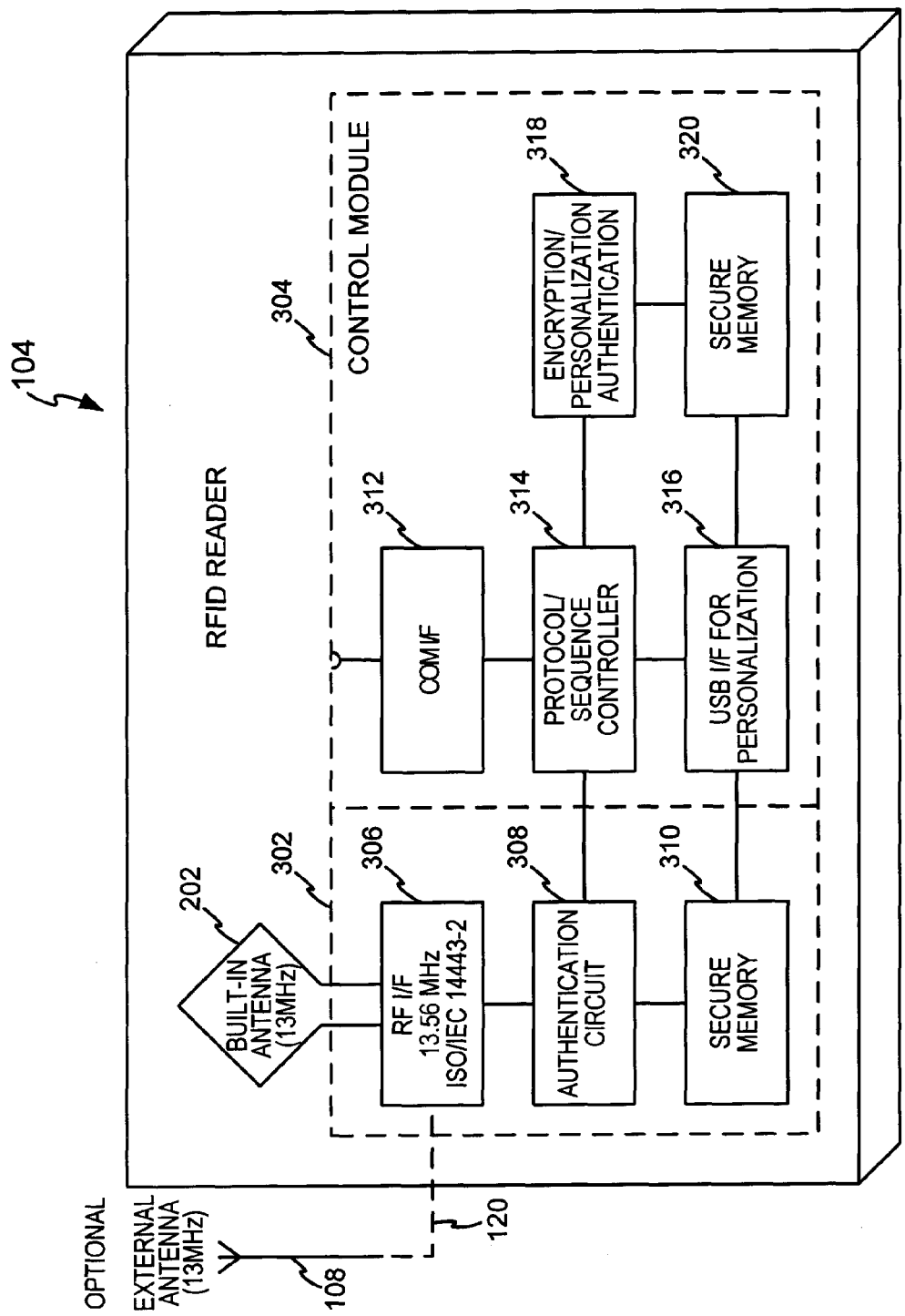
FIG. 3 is a schematic illustration of an exemplary RFID reader in accordance with the present invention.

FIG. 3 illustrates an exemplary block diagram of RFID reader 104 in accordance with an exemplary embodiment of the present invention. RFID reader 104 includes, for example, an antenna 202 coupled to a RF module 302, which may be further coupled to a control module 304. In addition, RFID reader 104 may include an antenna 108 positioned remotely from RFID reader 104 and coupled to RFID reader 104 via a suitable cable 120, or other wire or wireless connection.

RF module 302 and antenna 202 may be suitably configured to facilitate communication with fob 102. Where fob 102 may be formatted to receive a signal at a particular RF frequency, RF module 302 may be configured to provide an interrogation signal at that same frequency. For example, in one exemplary embodiment, fob 102 may be configured to respond to an interrogation signal of about 13.56 MHz. In this case, RFID antenna 202 may be 13 MHz and may be configured to transmit an interrogation signal of about 13.56 MHz. Fob 102 may be configured to include a first and second RF module (e.g., transponder) where the first module may operate using a 134 kHz frequency and the second RF module may operate using a 13.56 MHz frequency. RFID reader 104 may include two receivers which may operate using the 134 kHz frequency, the 13.56 MHz frequency or both. When the reader 104 may be operating at 134 kHz frequency, only operation with the 134 kHz module on fob 102 may be possible. When the reader 104 may be operating at the 13.56 MHz frequency, only operation with the 13.56 MHz module on fob 102 may be possible. Where the reader 104 supports both a 134 kHz frequency and a 13.56 MHz RF module, fob 102 may receive both signals from the reader 104. In this case, fob 102 may be configured to prioritize selection of the one or the other frequency and reject the remaining frequency. Alternatively, the reader 104 may receive signals at both frequencies from the fob upon interrogation. In this case, the reader 104 may be configured to prioritize selection of one or the other frequency and reject the remaining frequency.

Further, protocol/sequence controller 314 may include an optional feedback function for notifying the user of the status of a particular transaction. For example, the optional feedback may be in the form of an LED, LED screen and/or other visual display which may be configured to light up or display a static, scrolling, flashing and/or other message and/or signal to inform fob 102 user that the transaction may be initiated (e.g., fob may be being interrogated), the fob may be valid (e.g., fob may be authenticated), transaction may be being processed, (e.g., fob account number may be being read by RFID reader) and/or the transaction may be accepted or denied (e.g., transaction approved or disapproved). Such an optional feedback may or may not be accompanied by an audible indicator (or may present the audible indicator singly) for informing fob 102 user of the transaction status. The audible feedback may be a simple tone, multiple tones, musical indicator, and/or voice indicator configured to signify when fob 102 may be being interrogated, the transaction status, or the like.

RFID antenna 202 may be in communication with a transponder 306 for transmitting an interrogation signal and receiving at least one of an authentication request signal and/or an account data from fob 102. Transponder 306 may be of similar description as transponder 114 of FIG. 2. In particular, transponder 306 may be configured to send and/or receive RF signals in a format compatible with antenna 202 in similar manner as was described with respect to fob transponder 114. For example, where transponder 306 may be 13.56 MHz RF rated antenna 202 may be 13.56 MHz compatible. Similarly, where transponder 306 may be ISO/IEC 14443 rated, antenna 202 may be ISO/IEC 14443 compatible.

RF module 302 may include, for example, transponder 306 in communication with authentication circuitry 308 which may be in communication with a secure database 310. Authentication circuitry 308 and database 310 may be of similar description and operation as described with respect to authentication circuitry 210 and secure memory database 212 of FIG. 2. For example, database 310 may store data corresponding to fob 102 which are authorized to transact business over system 100. Database 310 may additionally store RFID reader 104 identifying information for providing to fob 102 for use in authenticating whether RFID reader 104 may be authorized to be provided the fob account number stored on fob database 214.

Authentication circuitry 308 may be of similar description and operation as authentication circuitry 210. That may be, authentication circuitry 308 may be configured to authenticate the signal provided by fob 102 in similar manner that authentication circuitry 210 may be configured to authenticate the signal provided by RFID reader 104. As may be described more fully below, fob 102 and RFID reader 104 may engage in mutual authentication. In this context, "mutual authentication" may mean that operation of the system 100 may not take place until fob 102 authenticates the signal from RFID reader 104, and RFID reader 104 authenticates the signal from fob 102.

Figure 4:
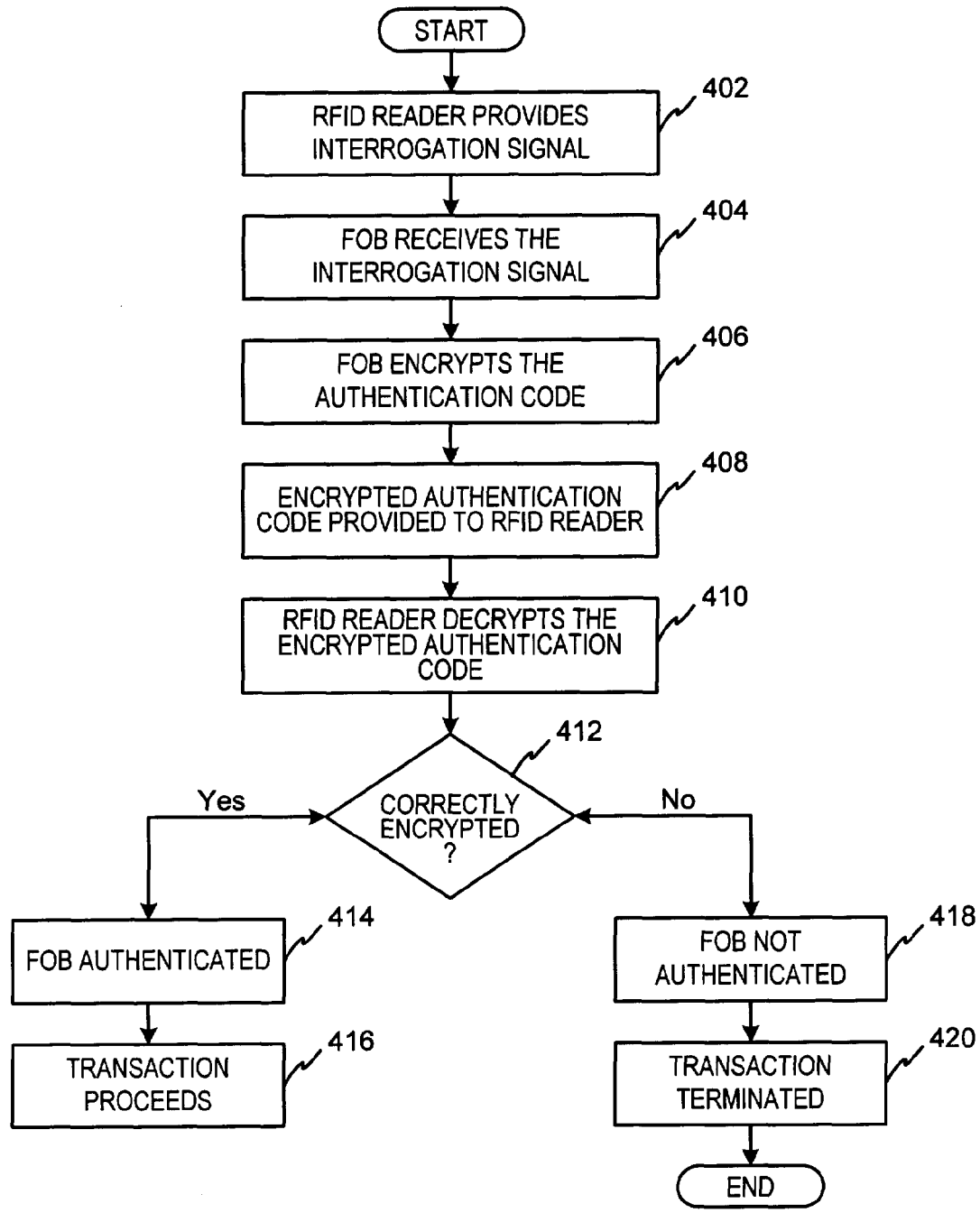
FIG. 4 is an exemplary flow diagram of an exemplary authentication process in accordance with the present invention.

FIG. 4 may be a flowchart of an exemplary authentication process in accordance with the present invention. The authentication process may be depicted as one-sided. The flowchart depicts the process of RFID reader 104 authenticating fob 102, although similar steps may be followed in the instance that fob 102 authenticates RFID reader 104.

As noted, database 212 may store security keys for encrypting or decrypting signals received from RFID reader 104. In an exemplary authentication process, where RFID reader 104 may be authenticating fob 102, RFID reader 104 may provide an interrogation signal to fob 102 (step 402). The interrogation signal may include a random code generated by the RFID reader authentication circuit 210, which may be provided to fob 102 and which may be encrypted using a unique encryption key corresponding to fob 102 unique identification code. For example, the protocol/sequence controller 314 may provide a command to activate the authentication circuitry 308. Authentication circuitry 308 may provide from database 310 a fob interrogation signal including a random number as a part of the authentication code generated for each authentication signal. The authentication code may be an alphanumeric code which may be recognizable (e.g., readable) by RFID reader 104 and fob 102. The authentication code may be provided to fob 102 via the RFID RF interface 306 and antenna 202 (or alternatively antenna 108).

Fob 102 may receive the interrogation signal (step 404). The interrogation signal including the authorization code may be received at the RF interface 114 via antenna 202. Once fob 102 may be activated, the interrogation signal, including the authorization code, may be provided to the modulator/demodulator circuit 206 where the signal may be demodulated prior to providing the signal to protocol/sequence controller 208. Protocol/sequence controller 208 may recognize the interrogation signal as a request for authentication of fob 102, and provide the authentication code to authentication circuit 210. Fob 102 may then encrypt the authentication code (step 406). In particular, encryption may be done by authentication circuit 210, which may receive the authentication code and encrypt the code prior to providing the encrypted authentication code to protocol/sequence controller 208. Fob 102 may then provide the encrypted authentication code to RFID reader 104 (step 408). The encrypted authentication code may be provided to RFID reader 104 via modulator/demodulator circuit 206, RF interface 114 (e.g., transponder 114) and antenna 202.

RFID reader 104 may then receive the encrypted authentication code and decrypt it (step 410). The encrypted authentication code may be received at antenna 202 and RF interface 306 and may be provided to authentication circuit 308. Authentication circuit 308 may be provided a security authentication key (e.g., transponder system decryption key) from database 310. The authentication circuit may use the authentication key to decrypt (e.g., unlock) the encrypted authorization code. The authentication key may be provided to the authentication circuit based on fob 102 unique identification code. For example, the encrypted authentication code may be provided along with the unique fob 102 identification code. The authentication circuit may receive fob 102 unique identification code and retrieve from the database 310 a transponder system decryption key correlative to the unique fob 102 identification code for use in decrypting the encrypted authentication code.

Once the authentication code may be decrypted, the decrypted authentication code may be compared to the authentication code provided by RFID reader 104 at step 402 (step 412) to verify its authenticity. If the decrypted authorization code is not readable (e.g., recognizable) by the authentication circuit 308, fob 102 may be deemed to be unauthorized (e.g., unverified) (step 418) and the operation of system 100 may be terminated (step 420). Contrarily, if the decrypted authorization code may be recognizable (e.g., verified) by fob 102, the decrypted authorization code may be deemed to be authenticated (step 414), and the transaction may be allowed to proceed (step 416). In one particular embodiment, the preceding transaction may mean that fob 102 may authenticate RFID reader 104, although, it should be apparent that RFID reader 104 may authenticate fob 102 prior to fob 102 authenticating RFID reader 104.

It should be noted that in an exemplary verification process, the authorization circuit 308 may determine whether the unlocked authorization code may be identical to the authorization code provided in step 402. If the codes are not identical then fob 102 may not be authorized to access system 100. Although, the verification process may be described with respect to identicality, identicality may be not required. For example, authentication circuit 308 may verify the decrypted code through any protocol, steps, or process for determining whether the decrypted code corresponds to an authorized fob 102.

Figure 5:
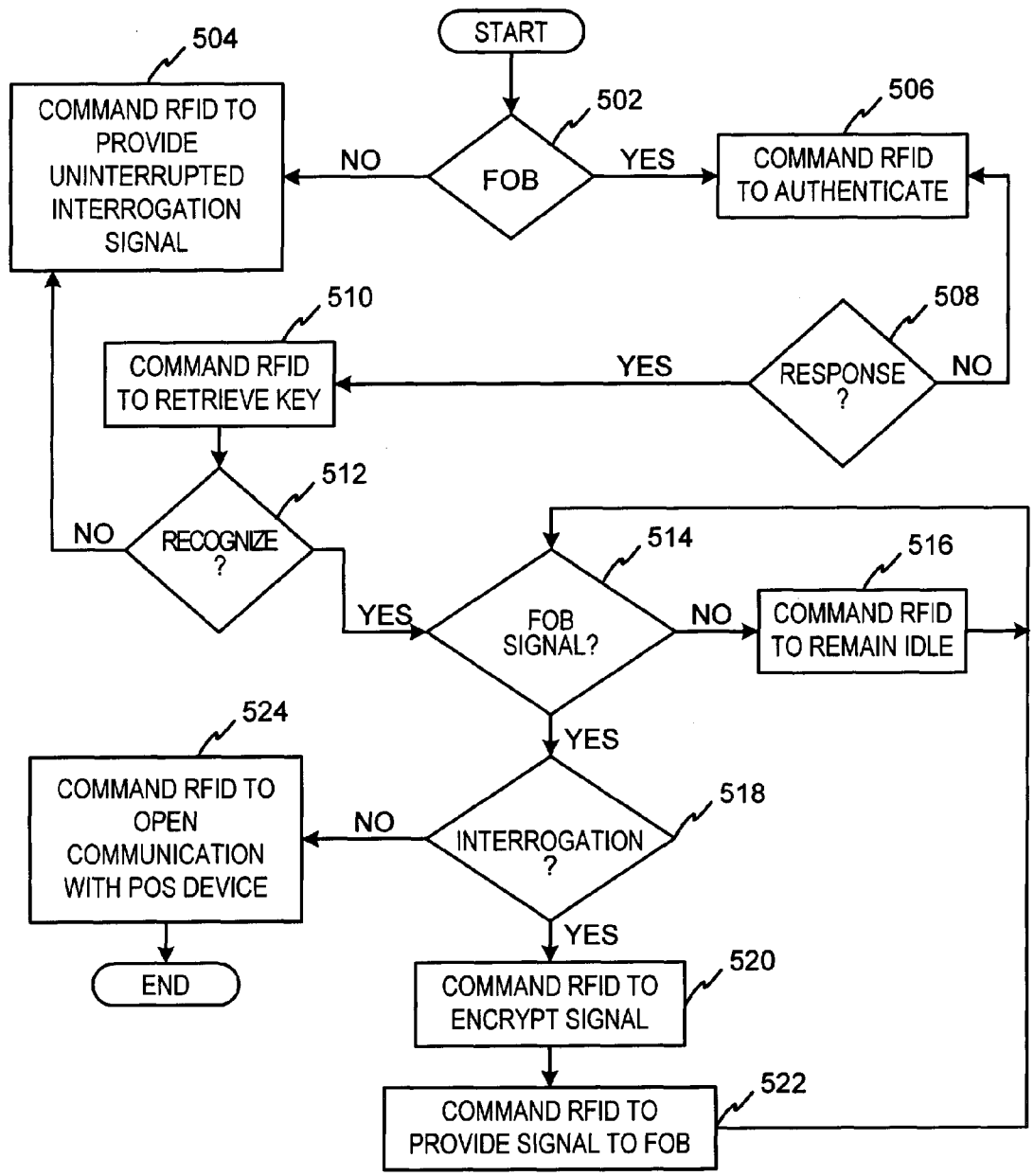
FIG. 5 is an exemplary flow diagram of an exemplary decision process for a protocol/sequence controller in accordance with the present invention.

Authentication circuitry 308 may additionally be in communication with a protocol/sequence controller 314 of similar operation and description as protocol/sequence controller 208 of FIG. 2. That may be, protocol/sequence device controller 314 may be configured to determine the order of operation of RFID reader 104 components. For example, FIG. 5 illustrates an exemplary decision process under which protocol/sequence controller 314 may operate. Protocol/sequence controller 314 may command the different components of RFID reader 104 based on whether fob 102 may be present (step 502). For example, if fob 102 may not be present, then protocol/sequence controller 314 may command RFID reader 104 to provide an uninterrupted interrogation signal (step 504). The protocol/sequence controller may command the authentication circuit 308 to provide an uninterrupted interrogation signal until the presence of fob 102 may be realized. If fob 102 may be present, the protocol/sequence controller 314 may command RFID reader 104 to authenticate fob 102 (step 506).

As noted above, authentication may mean that the protocol/sequence controller 314 may command the authentication circuit 308 to provide fob 102 with an authorization code. If a response may be received from fob 102, protocol/sequence controller may determine if the response may be a response to RFID reader 104 provided authentication code, or if the response may be a signal requiring authentication (step 508). If the signal requires authentication, then the protocol/sequence controller 314 may activate the authentication circuit as described above (step 506). On the other hand, if fob 102 signal may be a response to the provided authentication code, then the protocol/sequence controller 314 may command RFID reader 104 to retrieve the appropriate security key for enabling recognition of the signal (step 510). The protocol/sequence controller 314 may command the authentication circuit 308 to retrieve from database 310 a security key (e.g., transponder system decryption key), unlock the signal, and compare the signal to the signal provided by RFID reader 104 in the authentication process (e.g., step 506). If the signal is recognized, the protocol/sequence controller 314 may determine that fob 102 may be authorized to access the system 100. If the signal is not recognized, then the fob may be considered not authorized, in which case, protocol/sequence controller 314 may command the RFID controller to interrogate for authorized fobs (step 504).

Once the protocol/sequence controller determines that fob 102 may be authorized, the protocol/sequence controller 314 may seek to determine if additional signals are being sent by fob 102 (step 514). If no additional signal may be provided by fob 102, then the protocol/sequence controller 314 may provide all the components of RFID reader 104 to remain idle until such time as a signal may be provided (step 516). Contrarily, where an additional fob 102 signal may be provided, the protocol/sequence controller 314 may determine if fob 102 may be requesting access to the merchant point-of-sale terminal 110 (e.g., POS device) or if fob 102 may be attempting to interrogate RFID reader 104 for return (e.g., mutual) authorization (step 518). Where fob 102 may be requesting access to a merchant POS device 110, the protocol/sequence controller 314 may command the RFID reader to open communications with the POS device 110 (step 524). In particular, the protocol/sequence controller may command the POS device 110 communications interface 312 to become active, permitting transfer of data between RFID reader 104 and the merchant POS device 110.

On the other hand, if the protocol/sequence controller determines that fob 102 signal may be a mutual interrogation signal, then the protocol/sequence controller may command RFID reader 104 to encrypt the signal (step 520). The protocol/sequence controller 314 may command the encryption authentication circuit 318 to retrieve from database 320 the appropriate encryption key in response to fob 102 mutual interrogation signal. The protocol/sequence controller 314 may then command RFID reader 104 to provide the encrypted mutual interrogation signal to fob 102. The protocol/sequence controller 314 may command the authentication circuit 318 to provide an encrypted mutual interrogation signal for fob 102 to mutually authenticate. Fob 102 may then receive the encrypted mutual interrogation signal and retrieve from authentication circuitry 212 a RFID reader decryption key.

Although an exemplary decision process of protocol/sequence controller 314 may be described, it should be understood that a similar decision process may be undertaken by protocol/sequence controller 208 in controlling the components of fob 102. Indeed, as described above, protocol/sequence controller 314 may have similar operation and design as protocol/sequence controller 208. In addition, to the above, protocol/sequence controllers 208 and 314 may incorporate in the decision process appropriate commands for enabling USB interfaces 222 and 316, when the corresponding device may be so connected.

Encryption/decryption component 318 may be further in communication with a secure account number database 320 which stores the security keys for decrypting the encrypted fob account number. Upon appropriate request from protocol/sequence controller 314, encryption/decryption component (e.g., circuitry 318) may retrieve the appropriate security key, decrypt the fob account number and forward the decrypted account number to protocol sequence controller 314 in any format readable by any later connected POS device 110. In one exemplary embodiment, the account number may be forwarded in a conventional magnetic stripe format compatible with the ISO/IEC 7813 standard. Upon receiving the account number in magnetic stripe format, protocol/sequence controller 314 may forward the account number to POS device 110 via a communications interface 312 and data link 122, as best shown in FIG. 1. POS device 110 may receive the decrypted account number and forward the magnetic stripe formatted account number to a merchant network 112 for processing under the merchant's business as usual standard. In this way, the present invention eliminates the need of a third-party server. Further, where POS device 110 may receive a response from network 112 (e.g., transaction authorized or denied), protocol/sequence controller 314 may provide the network response to the RF module 302 for optically and/or audibly communicating the response to fob 102 user.

RFID reader 104 may additionally include a USB interface 316, in communication with the protocol/sequence controller 314. In one embodiment, the USB interface may be a RS22 serial data interface. Alternatively, RFID reader 104 may include a serial interface such as, for example, a RS232 interface in communication with the protocol/sequence controller 314. The USB connector 316 may be in communication with a personalization system 116 (shown in FIG. 18) for initializing RFID reader 104 to system 100 application parameters. Prior to operation of system 100, RFID reader 104 may be in communication with personalization system 116 for populating database 310 with a listing of security keys belonging to authorized fobs 102, and for populating database 320 with the security keys to decrypt fob 102 account numbers placing the account numbers in ISO/IEC 7813 format. In this way, RFID reader 104 may be populated with a unique identifier (e.g., serial number) which may be used by fob authentication circuitry 210 to determine if RFID reader 104 may be authorized to receive fob 102 encrypted account number.

FIG. 8 illustrates an exemplary flow diagram for the operation of system 100. The operation may be understood with reference to FIG. 1, which depicts the elements of system 100 which may be used in an exemplary transaction. The process may be initiated when a customer desires to present fob 102 for payment (step 802). Upon presentation of fob 102, the merchant initiates the RF payment procedure via an RFID reader 104 (step 804). In particular, the RFID reader sends out an interrogation signal to scan for the presence of fob 102 (step 806). The RF signal may be provided via the RFID reader antenna 106 or optionally via an external antenna 108. The customer may then present fob 102 for payment (step 808) and fob 102 may be activated by the RF interrogation signal provided.

Fob 102 and RFID reader 104 may then engage in mutual authentication (step 810). Where the mutual authentication may be unsuccessful, an error message may be provided to the customer via the RFID optical and/or audible indicator (step 814) and the transaction may be aborted (step 816). Where the mutual authentication may be successful (step 814), RFID reader 104 may provide the customer with an appropriate optical and/or audible message (e.g., "transaction processing" or "wait") (step 818). The fob protocol/sequence controller 208 may then retrieve from database 214 an encrypted fob account number and provide the encrypted account number to RFID reader 104 (step 820).

RFID reader 104 may then decrypt the account number and convert the account number into magnetic stripe (ISO/IEC 7813) format (step 822) and provide the unencrypted account number to the merchant system 130 (step 828). In particular, the account number may be provided to POS device 110 for transmission to the merchant network 112 for processing under known business transaction standards. POS device 110 may then send an optical and/or audible transaction status message to RFID reader 104 (step 830) for communication to the customer (step 832) and the transaction is completed (step 834).

It should be noted that the transaction account associated with fob 102 may include a restriction, such as, for example, a per purchase spending limit, a time of day use, a day of week use, certain merchant use and/or the like, wherein an additional verification may be required when using the fob outside of the restriction. The restrictions may be personally assigned by fob 102 user, or the account provider. For example, in one exemplary embodiment, the account may be established such that purchases above $X (i.e., the spending limit) must be verified by the customer. Such verification may be provided using a suitable PIN which may be recognized by RFID reader 104 or a payment authorization center (not shown) as being unique to fob 102 holder (e.g., customer) and the correlative fob 102 transaction account number. Where the requested purchase may be above the established per purchase spending limit, the customer may be required to provide, for example, a PIN, biometric sample and/or similar secondary verification to complete the transaction.

Where a verification PIN may be used as secondary verification the verification PIN may be checked for accuracy against a corroborating PIN which correlates to fob 102 transaction account number and/or the fob user's travel-related information. The corroborating PIN may be stored locally (e.g., on fob 102, or on RFID reader 104) or may be stored on a database (not shown) at the payment authorization center. The payment authorization center database may be any database maintained and operated by fob 102 transaction account provider.

The verification PIN may be provided to POS device 110 using a conventional merchant (e.g., POS) PIN key pad 118 in communication with POS device 110 as shown in FIG. 1, or a RFID keypad in communication with RFID reader 104. PIN keypad may be in communication with POS device 110 (or alternatively, RFID reader 104) using any conventional data link described above. Upon receiving the verification PIN, RFID reader 104 may seek to match the PIN to the corroborating PIN stored on RFID reader 104 at database 310 or 320. Alternatively, the verification PIN may be provided to a payment authorization center to determine whether the PIN matches the PIN stored on the payment authorization center database which correlates to fob 102 account. If a match may be made, the purchase may no longer be restricted, and the transaction may be allowed to be completed.

In another exemplary embodiment of the present invention, system 100 may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof. While the example discussed herein may include a particular biometric system or sample, the invention contemplates any of the biometrics discussed herein in any of the embodiments.

The biometric system may be configured as a security system and may include a registration procedure in which a user of transaction instrument (e.g., fob 102) proffers a sample of his fingerprints, DNA, retinal scan, voice, and/or other biometric sample to an authorized sample receiver (ASR). An ASR may include a local database, a remote database, a portable storage device, a host system, an issuer system, a merchant system, a fob issuer system, an employer, a financial institution, a non-financial institution, a loyalty point provider, a company, the military, the government, a school, a travel entity, a transportation authority, a security company, and/or any other system or entity that is authorized to receive and store biometric samples and associate the samples with specific biometric databases and/or transaction instruments (e.g., fobs 102). As used herein, a user of a fob, fob user, or any similar phrase may include the person or device holding or in possession of the fob, or it may include any person or device that accompanies or authorizes the fob owner to use the fob. By proffering one or more biometric samples, a biometric may be scanned by at least one of a retinal scan, iris scan, fingerprint scan, hand print scan, hand geometry scan, voice print scan, vascular scan, facial and/or ear scan, signature scan, keystroke scan, olfactory scan, auditory emissions scan, DNA scan, and/or any other type of scan to obtain a biometric sample.

Upon scanning the sample, the system may submit the scanned sample to the ASR in portions during the scan, upon completing the scan or in batch mode after a certain time period. The scanned sample may include a hardcopy (e.g., photograph), digital representation, an analog version or any other configuration for transmitting the sample. The ASR may receive the sample and the ASR may also receive copies of a fob user's biometric data along with the sample or at a different time (or within a different data packet) from receiving the sample.

The ASR and/or fob user 102 may store the sample in digital and/or any storage medium known in the art and correlate and/or register the sample with fob user information. By storing the sample in digital format, the ASR may digitize any information contained in one of the biometric scans described herein. By storing the sample in any storage medium, the ASR may print and/or store any biometric sample. Hardcopy storage may be desirable for back-up and archival purposes. As used herein, registered samples may include samples that have been proffered, stored and associated with user information.

The biometric sample may also be associated with user information. The sample may be associated with user information at any step in the process such as, for example, prior to submission, during submission and/or after submission. In one embodiment, the user may input a PIN number or zip code into the POS terminal, then scan the biometric to create the biometric sample. The local POS system may associate the biometric sample data with the PIN and zip code, then transmit the entire packet of information to the ASR. In another embodiment, the POS may facilitate transmitting the sample to an ASR, and during the transmission, the sample may be transmitted through a third system which adds personal information to the sample.

The information associated with the biometric sample may include any information such as, for example, fob user information, fob 102 information, fob 102 identifier information, fob 102 vender information, fob 102 operability information, and/or fob 102 manufacturing information. Fob 102 information is not limited to transponder information and may include information related to any transaction instrument such as smart fobs, credit fobs, debit fobs, merchant-specific fobs, loyalty point fobs, cash accounts and any other transaction instruments and/or accounts. The fob user information may also contain information about the user including personal information—such as name, address, and contact details; financial information—such as one or more financial accounts associated with the fob user; loyalty point information—such as one or more loyalty point accounts (e.g., airline miles, charge fob loyalty points, frequent diner points) associated with the fob user; and/or non-financial information—such as employee information, employer information, medical information, family information, and/or other information that may be used in accordance with a fob user.

For example, fob user may have previously associated a credit card account, a debit card account, and a frequent flier account with his biometric sample which is stored at an ASR. Later, when fob user desires to purchase groceries, fob user may submit his biometric sample while using fob 102 for the purchase at a POS. The POS may facilitate sending the biometric sample to the ASR such that the ASR authorizes the biometric sample and checks a look-up table in the ASR database to determine if any information is associated with the sample. If information (e.g., financial accounts) is associated with the sample, the ASR may transmit the information to the POS terminal. The POS terminal may then present fob user with a list of the three accounts associated with the biometric sample. Fob user and/or a merchant may then choose one of the accounts in order to continue and finalize the transaction.

The ASR and/or fob user may associate a specific fob 102 identifier with the biometric sample by any method known in the art for associating an identifier (e.g., through the use of software, hardware and/or manual entry). The ASR may additionally verify the fob user and/or fob 102 by using one or more forms of the user's secondary identification. For example, the ASR may verify the fob user by matching the fob information to information retrieved from scanning information from a fob user's driver's license. The ASR may verify fob 102 by contacting the vendor of fob 102 to confirm that fob 102 was issued to a specific fob user. In another embodiment, the ASR may activate fob 102 during the registration procedure to confirm that fob 102 transponder identifier and other information is properly associated with the fob user and the fob user's specific biometric samples. The ASR may additionally employ one or more verification methods to confirm that the biometric sample belongs to the user, such as, for example, the ASR may request from the user demographic information, further biometric samples and/or any other information. As used herein, "confirm," "confirmation" or any similar term includes verifying or substantially verifying the accuracy, existence, non-existence, corroboration, and/or the like of the information, component, or any portion thereof. The ASR may additionally employ one or more additional processing methods in order to facilitate association of a biometric sample. As used herein, the term processing may include scanning, detecting, associating, digitizing, printing, comparing, storing, encrypting, decrypting, and/or verifying a biometric and/or a biometric sample, or any portion thereof.

Upon association, authentication and/or verification of the biometric sample and fob 102, the system may store the sample and fob 102 identifier in one or more databases on and/or in communication with system 100 via a network, server, computer, or any other means of communicating as described herein. The database(s) may be any type of database described herein. For example, a biometric sample stored on fob 102 may be stored in database 212. The database(s) may be located at or operated by any of the entities discussed herein such as, for example, the ASR and/or by a third-party biometric database operator.

The system may further protect the samples by providing additional security with the sample. The security may include, for example, encryption, decryption, security keys, digital certificates, firewalls and/or any other security methods known in the art and discussed herein. One or more security vendors may utilize the security methods to store and/or access the biometric samples. The present invention anticipates that storage of the biometric samples may be such that a sample is first encrypted and/or stored under a security procedure, such that the sample may only be accessed by a vendor with the proper level of access or security which corresponds to or provides access to the stored sample. The samples may be accessible by certain vendors such as, for example, fob 102 transaction account provider system, an issuer system, a merchant system, a fob issuer system, an employer, a financial institution, a non-financial institution, a loyalty-point provider, a company, the military, the government, a school, a travel entity, a transportation authority, and/or a security company.

Figure 9:
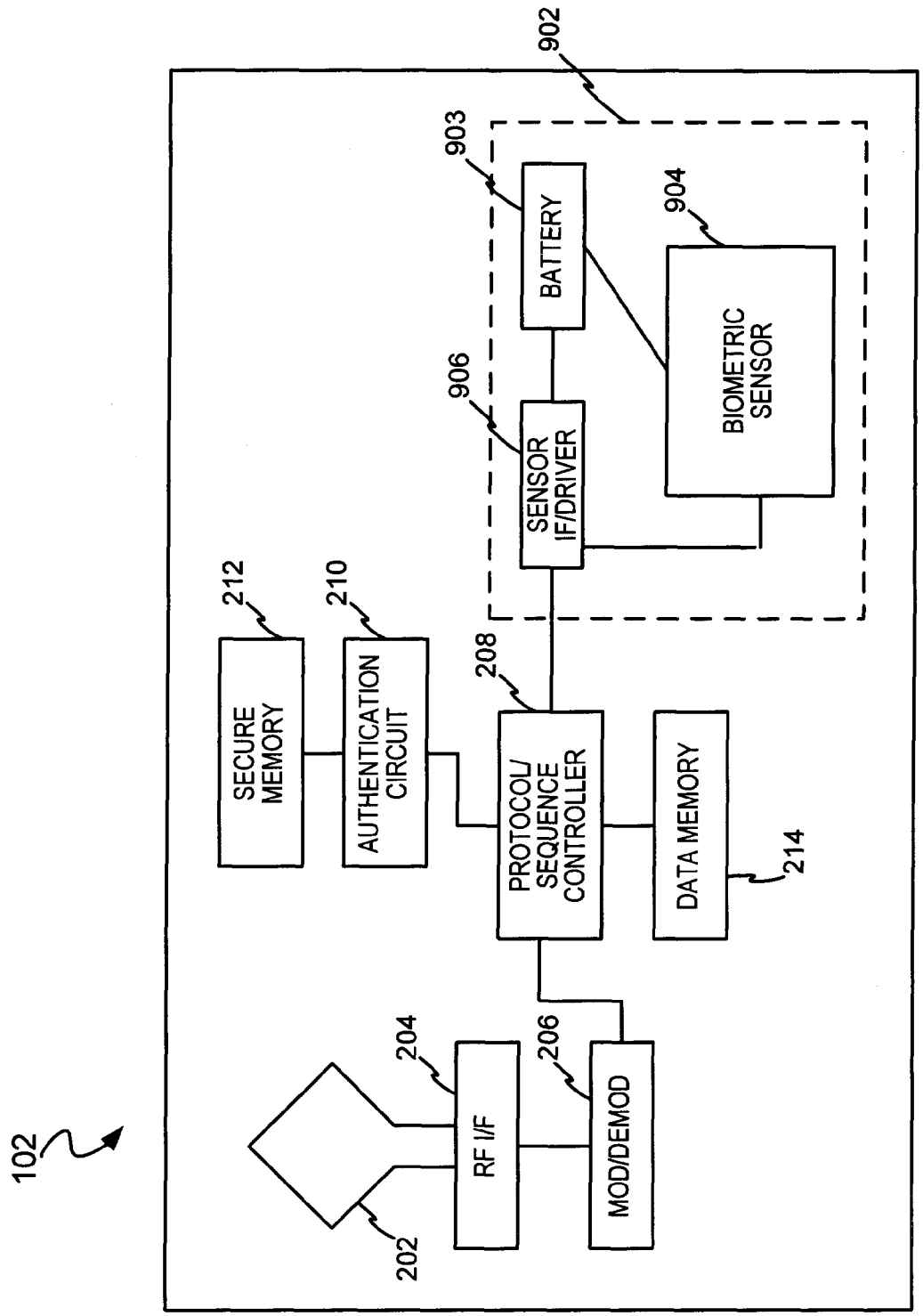
FIG. 9 is another schematic illustration of an exemplary fob in accordance with the present invention.

The fob of the invention may include a particular security system wherein the security system incorporates a particular biometric system. As shown in FIG. 9, fob 102 may include a biometric security system 902 configured for facilitating biometric security using, for example, fingerprint samples. As used herein, fingerprint samples may include samples of one or more fingerprints, thumbprints, palm-prints, footprints, and/or any portion thereof. Biometric security system 902 may include a biometric sensor 904 which may be configured with a sensor and/or other hardware and/or software for acquiring and/or processing the biometric data from the person such as, for example, optical scanning, capacitance scanning, or otherwise sensing the portion of fob user. In one embodiment, biometric sensor 904 of the security system 902 may scan a finger of a fob user in order to acquire his fingerprint characteristics into fob 102. Biometric sensor 904 may be in communication with a sensor interface/driver 906 such that sensor interface 906 may receive the fingerprint information and transmits a signal to controller 208 to facilitate activating the operation of fob 102. A power source (e.g., battery 903) may be in communication with biometric sensor 904 and sensor interface 906 to provide the desired power for operation of the biometric security system components.

In one exemplary application of fob 102 incorporating biometric security system 902, the user may place his finger on the biometric sensor to initiate the mutual authentication process between fob 102 and RFID reader 104, and/or to provide verification of the user's identity. Fob 102 may digitize the fingerprint and compare it against a digitized fingerprint stored in a database (e.g., security database 212) included on fob 102. The fingerprint information may additionally be compared with information from one or more third-party databases communicating with fob 102 through any communication software and/or hardware, including for example, RFID reader 104, a USB connection, a wireless connection, a computer, a network and/or any other means for communicating. This transfer of information may include use of encryption, decryption, security keys, digital certificates and/or other security devices to confirm the security of the sample. Fob 102 may additionally communicate with third-party databases to facilitate a comparison between fob 102 identifier and other fob identifiers stored with the biometric samples. As used herein, compare, comparison and similar terms may include determining similarities, differences, existence of elements, non-existence of elements and/or the like.

Protocol/sequence controller 208 may facilitate the local comparison to authenticate the biometric and authentication circuit 210 may validate the information. Any of the embodiments may alternatively or additionally include remote comparisons performed or controlled by one or more third-party security vendors. One or more comparison techniques and/or technologies may be used for comparisons. For example, for fingerprint comparisons, protocol/sequence controller 208 may utilize an existing database to compare fingerprint minutia such as, for example, ridge endings, bifurcation, lakes or enclosures, short ridges, dots, spurs and crossovers, pore size and location, Henry System categories such as loops, whorls, and arches, and/or any other method known in the art for fingerprint comparisons.

Fob 102 may additionally be configured with secondary security procedures to confirm that fake biometric samples are not being used. For example, to detect the use of fake fingers, fob 102 may be further configured to measure blood flow, to check for correctly aligned ridges at the edges of the fingers, and/or any other secondary procedure to reduce biometric security fraud. Other security procedures for ensuring the authenticity of biometric samples may include monitoring pupil dilation for retinal and/or iris scans, pressure sensors, blinking sensors, human motion sensors, body heat sensors and/or any other procedures known in the art for authenticating the authenticity of biometric samples.

After verifying the biometric information, fob 102 and RFID reader 104 may begin mutual authentication, and the transaction may proceed accordingly. However, the invention contemplates that the verification of biometric information may occur at any point in the transaction such as, for example, after the mutual authentication. At any point in the transaction, the system may additionally request fob user to enter a PIN and/or other identifier associated with the transaction account and/or biometric sample to provide further verification of fob user's identification. As part of the transaction, fob user payer may be requested to select from one of the financial accounts, loyalty accounts, credit accounts, debit account, and/or other accounts associated with the biometric sample. The user may be presented with a list of account options on a display associated with RFID reader 104, fob 102, a third-party security device and/or any other financial or transaction device association with a transaction. In another embodiment, a payee may select one of the accounts. For example, a department store payee may manually and/or automatically select a department store issued account, if available, for a transaction.

The present invention includes systems and methods for facilitating personalizing and dynamically synchronizing fobs and associated databases in the context of a distributed transaction system. More particularly, referring now to FIG. 10, an exemplary dynamic synchronization system (DSS) may comprise a support client server 1004 (e.g., a secure server), a fob object database update system 1006 (FODUS), one or more enterprise data synchronization interfaces 1008 (EDSI), an update logic system 1010, one or more enterprise data collection units 1012 (EDCUs), and one or more POS devices 110 configured with RFID reader 104 to interoperably accept information from and interface with fobs 102. In an exemplary embodiment, DSS may also suitably comprise a personalization system 116 and an account maintenance system 142 configured to communicate with FODUS 1006.

More particularly, in an exemplary embodiment, secure support client server 1004 may communicate over a suitable network to EDSIs 1008 through enterprise networks 1014. EDSIs 1008 communicate with update logic system 1010, which itself communicates with enterprise data collection units 1012. Enterprise data collection units 1012 communicate with FODUS 1006 and secure support client server 1004. In general, as described in further detail below, each enterprise (e.g., airline partner, hotel partner, travel agency, etc.) may be associated with a corresponding EDSI 1008, network 11014, and EDCU 1012. That is, EDCU 1012(a) corresponds to EDSI 1008(a) and network 1014(a), EDCU 1012(b) corresponds to EDSI 1008(b) and network 1014(b), and so on. The DSS may include an arbitrary number of such functional blocks in accordance with the number of enterprises represented.

Personalization system 116 may suitably function as the issuing source of fobs 102. That is, personalization system 116 facilitates creating and issuing fobs for use by the consumer by providing a predetermined file structure populated with initialization data (e.g., account numbers, serial numbers, default preferences, and the like). In this regard, FODUS 1006 interfaces with personalization system 116 in order to facilitate re-issuance of the fob by providing updated data in the event a fob is destroyed, lost, or stolen. Personalization system 116 is described in detail below in conjunction with FIG. 18.

Account maintenance system 142 may be provided for customer service purposes and, in this capacity, may act as the point of entry for fob user complaints, questions, and other customer input. FODUS 1006 may suitably communicate with account maintenance system 142 in order to assist customer service representatives and/or automated systems in addressing fob user issues.

POS devices 110 may allow the fob user to gain access to the distributed transactions system through a variety of means. Such POS devices may include, for example, standard home telephones, various PCS wireless systems, pay phones, palmtops computers, notebook computers, Internet workstations, automated teller machines (ATMs), point-of-sale terminals (POS) stand-alone kiosks, network computers (NCs), personal data assistants (PDAs), or any other suitably configured communication apparatus. POS device 110 may be portable (as in the case of PDAs and cellular phones) or centrally located, for example, in airline ticketing and gate areas, rental car facilities, hotel lobbies, travel agencies, and malls. In addition, businesses may host POS device 110 to streamline their employees" business travel. In an exemplary embodiment, various POS devices 110 may be configured to interface with (or incorporate) contactless fobs 102 or fob receivers in accordance with the relevant portions of the ISO-14443 standard.

Secure support client server 1004 may provide, where appropriate, any functionality missing from the individual POS devices 110 used during a transaction. Server 1004 also suitably handles routing of messages from POS device 110 to the appropriate EDSI 1008 and/or EDCU 1012.

Figure 10:
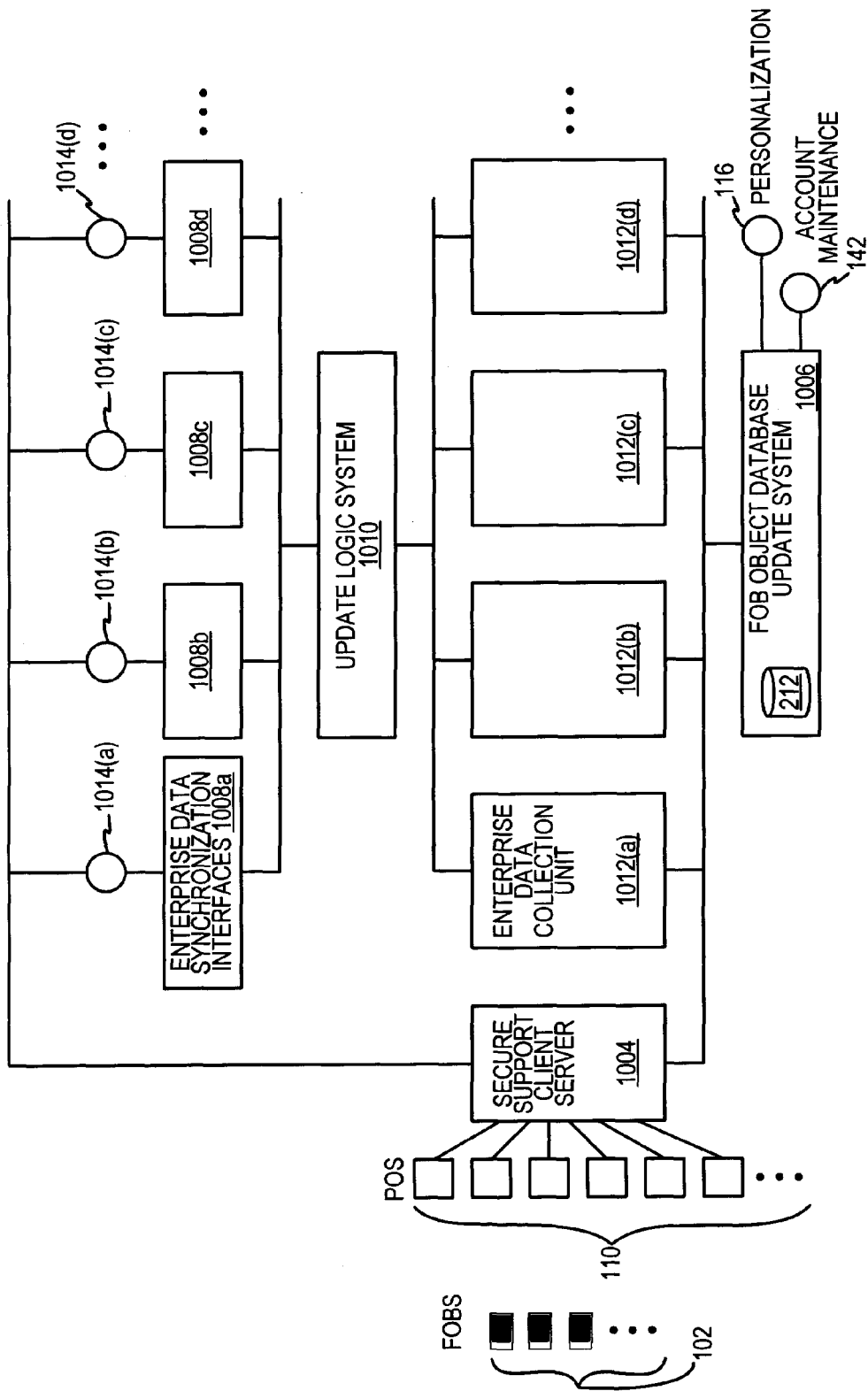
FIG. 10 is a schematic overview of an exemplary dynamic synchronization system in accordance with various aspects of the present invention.
Figure 11:
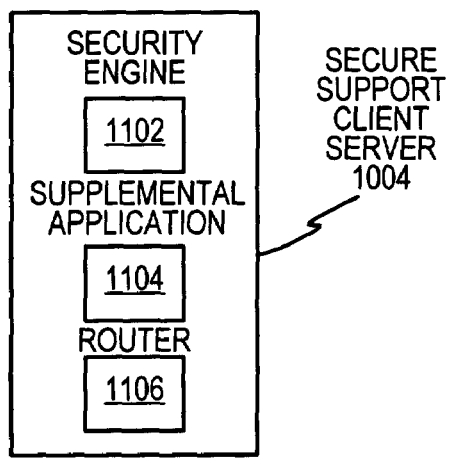
FIG. 11 is a schematic overview of an exemplary secure support client server.

Referring now to FIGS. 10 and 11, an exemplary secure support client server 1004 may comprise a security engine 1102, a supplemental application support 1104, and a router 1106. Security engine 1102 may comprise suitable hardware and/or software configured to provide messaging (e.g., secure messaging) between server 1004, EDSUs 1012, and networks 1014. More specifically, security engine 1102 utilizes authentication, data encryption, and digital signature techniques in connection with incoming and outgoing message packets. A variety of conventional security algorithms are suitable in the context of the present invention, including, for example, DES encryption, RSA authentication, and a variety of other symmetrical and non-symmetrical cryptographic techniques.

Supplemental application support 1104 may comprise suitable hardware and/or software components related to specific POS device 110 functionality. More particularly, server 1004 may suitably determine the nature of POS device 110 utilized during a transaction. If POS device 110 does not include the appropriate software for effecting the requested transaction, then server 1004 supplies the functionality (i.e., software modules) which completes the transaction with respective EDSIs 1008 and/or EDCUs 1012. The supplemental functionality may include, inter alia, software modules for properly formatting message packets (described in further detail below) sent out over the various networks comprising the DSS. For example, where a transaction takes place via POS device 110 which may consist entirely of a stand-alone RFID reader 104, then nearly all functionality may be supplied by server 1004 because RFID reader 104, by itself, may only be capable of transferring messages to and from fob 102 in a "dumb" manner. However, when a suitably configured PC and/or RFID reader 104 is configured with POS device 110, most functionality may be supplied by various software modules residing in the PC and/or RFID reader 104. In such a case, server 1004 may only transfer the various message packets to and from POS device 110 without supplying additional software. Added functionality may be supplied through any suitable method, for example, through the use of portable software code (e.g., Java, ActiveX, and the like), or distributed software residing within POS device 110, fobs 102, RFID reader 104 and/or server 1004.

Router 1106 suitably handles routing of messages to the appropriate EDCUs 1012, networks 1014, and POS device 110. That is, router 1106 may be configured to identify the appropriate functional blocks within the DSS to which a given message packet should be sent. The identification of the appropriate functional blocks may take place in a number of ways. In an exemplary embodiment, the identification may be accomplished through the use of a look-up table comprising a list of appropriate destinations keyed to information extracted from requests received from POS device 110.

In an alternate embodiment, a secure support client server 1004 may not be used, and the functionality of POS devices 110 may be suitably specified in order to obviate the need for server 1004. Alternatively, the functions of server 1004 may be allocated and distributed throughout the DSS components in any advantageous manner.

It will be appreciated by those skilled in the art that the term "transaction" refers, generally, to any message communicated over the system for effecting a particular goal, for example, travel transaction, financial transaction, debit/charge authorization, preference changes, reservation requests, ticket requests, and the like. FIG. 7, for example, shows an exemplary transaction data structure useful in the context of performing an on-line transaction with a travel partner, wherein the field name 702, data type 704 ("C" for character), maximum byte-length 706, and description 708 are listed in tabular form. In this example, the transaction messages suitably may comprise comma delimited data packets, although other data structures may be employed.

Figure 15:
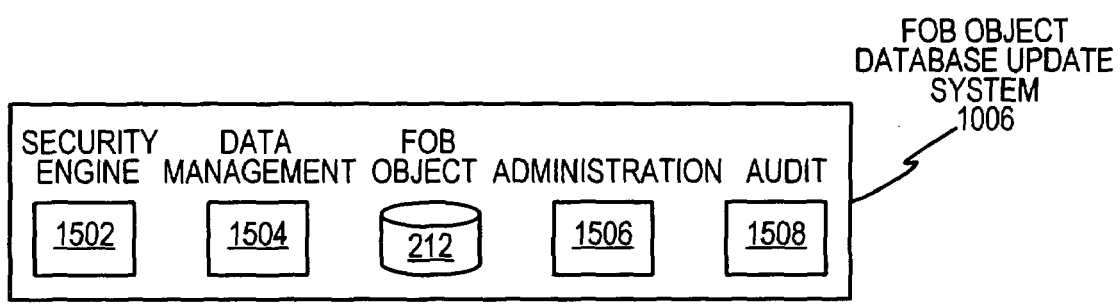
FIG. 15 is a schematic overview of an exemplary fob object database update system (FODUS)

FODUS 1006 suitably stores information (e.g., securely stores) related to the state of the various issued fobs 102. Referring now to FIGS. 10 and 15, in an exemplary embodiment, FODUS 1006 may comprise a security engine 1502, a data management module 1504, a fob object database 212, a fob object administration module 1506, and an audit file 1508.

Security engine 1502 may provide suitable security for, inter alia, the information stored within fob object database 212. In this regard, security engine 1502 may utilize various authentication, data encryption, and digital signature techniques in connection with incoming and outgoing message packets. Suitable algorithms in the context of the present invention, include, for example, DES encryption, RSA authentication, and a variety of other symmetrical and non-symmetrical cryptographic techniques.

Data management module 1504 may suitably act as a data interface between FODUS 1006 and account maintenance 142 as well as between FODUS 1006 and the various EDCUs 1012. More specifically, module 604 facilitates converting and translating between the data format used in these systems. For example, data stored within object database 106 may not be stored in a format which may be easily used by EDCUs 1012 or account maintenance 142. Accordingly, data management module 1504 may comprise suitable routines for effecting conversion and formatting of both incoming and outgoing data.

Fob object administration module 1506 may provide suitable database software to edit, update, delete, synchronize, and ensure substantial non-corruption of data stored within object database 212. A variety of database packages are suitable for this task, including, for example, various conventional fourth-generation relational database management systems (4GL RDBMS).

Audit file 1508 may suitably track changes to object database 116, thereby helping to ensure the integrity of fob data stored within FODUS 1006. More particularly, when changes to object database 116 take place as a result of preference updates, transactions, application structure changes, and the like, audit file 1508 may track suitable information related to these changes (e.g., time, date, and nature and content of the change).

Fob object database 212, which may comprise a single database or a set of distributed databases, may be used to store the known state of the various fobs 102. In general, the state of a fob may be characterized by a suitable set of fob indicia. In an exemplary embodiment, wherein a data structure in accordance with ISO-7816 is employed, fob object database 212 stores information related to the individual applications present on the various fobs 102 (i.e., the overall file structure) as well as the individual fields, directories, and data that may comprise those applications. A file structure for fob object database 212 may be chosen such that it includes a suitable set of data fields for a given fob 102.

Figure 12:
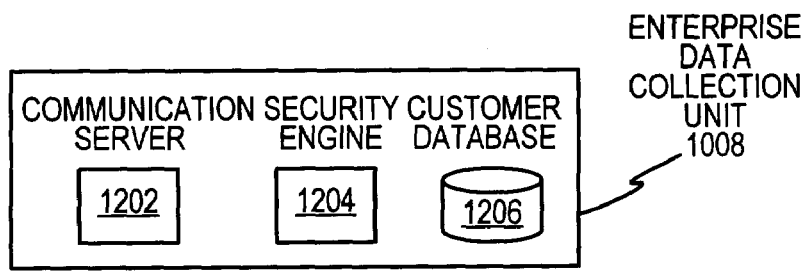
FIG. 12 is a schematic overview of an exemplary enterprise data synchronization interface.

In an exemplary embodiment, the various EDSIs 1008 may track changes to fob data and/or applications corresponding to individual enterprises. With reference to FIGS. 10 and 12, in an exemplary embodiment, EDSI 1008 may comprise a communication server 1202, a security engine 1204, and a customer database 1206.

Communication server 1202 may suitably facilitate communication with networks 112 and update logic system 1010. In this regard, server 302 may be configured to translate between various formats, media, and communication protocols as may be necessary or desired given the particular choice of components employed.

Security engine 1204 may provide suitable security measures with respect to the access and storage of information with customer database 1206. Security engine 1204 may utilize various authentication, data encryption, and digital signature techniques in connection with incoming and outgoing message packets. Suitable algorithms in the context of the present invention, may include, for example, DES encryption, RSA authentication, and a variety of other symmetrical and non-symmetrical cryptographic techniques.

Customer database 1206 may suitably provide a means for storing fob information related to individual partners or enterprises. That is, a particular enterprise (hosting, for example, network 112(*a*)) may compile, or employ others to compile, fob information related only to that enterprise. For example, a hotel chain may store loyalty, preference, and other data that relates specifically to that hotel chain. During synchronization (as described in further detail below) any changes to database 306 may be propagated through the system and, visa-versa, changes elsewhere in the system may be communicated to database 306. This communication may be done securely (using security engine 1204) in conjunction with communication server 1202.

In an alternate embodiment, the functionality provided by the EDSIs 1008 may be folded into the corresponding EDCU 1012. That is, while an illustrated embodiment may employ one or more physically separate EDSIs 1008, it may be advantageous to further streamline the DSS by incorporating this functionality into the corresponding EDCU 1012 functional block.

Figure 13:
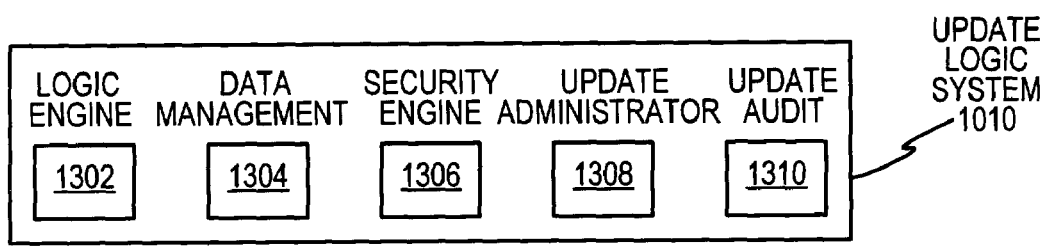
FIG. 13 is a schematic overview of an exemplary update logic system.

In an exemplary embodiment, update logic system 1010 may format and securely routes fob data received from and transmitted to EDCUs 1012 and EDSIs 1008. Referring now to FIG. 13, in an exemplary embodiment, update logic system 1010 may include a logic engine 1302, a data management module 1304, a security engine 1306, an enterprise update administrator 1308, and an enterprise update audit module 1310.

Logic engine 1302 may suitably function to direct and distribute information changes across the system. Thus, logic engine 1302 may be able to determine which modules (i.e., which EDCUs 1012 and EDSIs 1008) need to reflect the change.

Data management module 1304 may suitably act as a data interface between EDSIs 1008 and EDCUs 1012. More specifically, module 1304 may be able to convert and translate between data format used in these systems. Accordingly, data management module 1304 may comprise suitable routines for effecting conversion and formatting of both incoming and outgoing data.

Security engine 1306 may be used to provide suitable security measures with respect to data flowing through update logic system 1010. Security engine 1306 may utilize various authentication, data encryption, and digital signature techniques in connection with incoming and outgoing message packets. Suitable algorithms in the context of the present invention, may include, for example, DES encryption, RSA authentication, and a variety of other symmetrical and non-symmetrical cryptographic techniques.

Enterprise update administrator 1308 may suitably comprise overhead software used to maintain data transfer between EDSIs 1008 and EDCUs 1012.

Enterprise update audit module 1310 may suitably track updated information flowing through update logic system 1010. More particularly, when information is communicated across update logic system 1010 (as a result of preference updates, transactions, application structure changes, and the like), audit module 1310 may track suitable indicia of this information (e.g., time, date, and nature and content of the communication).

Figure 14:
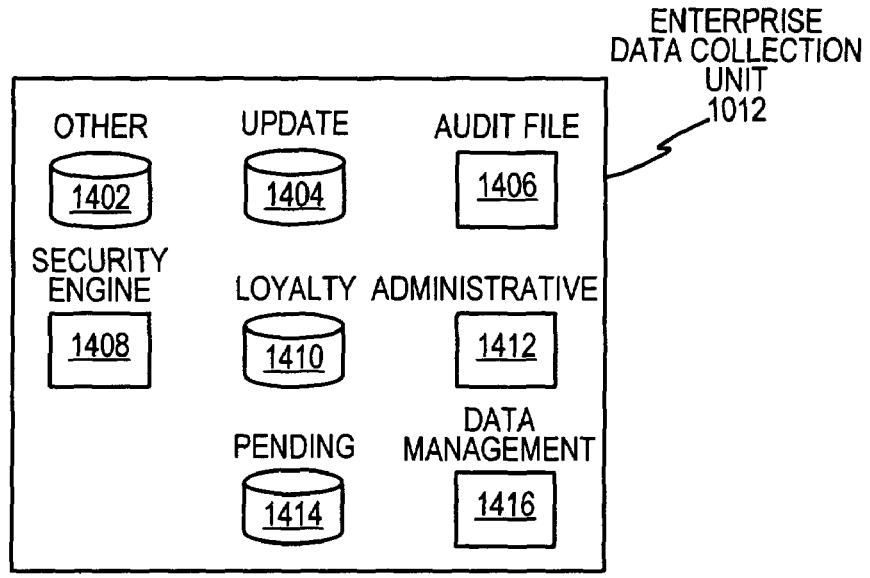
FIG. 14 is a schematic overview of an exemplary enterprise data collection unit.

EDCUs 1012 may facilitate storing and coordinating the transfer of synchronization data corresponding to a particular enterprise. With reference to FIG. 14, in an exemplary embodiment, enterprise data collection unit 1012 may include a security engine 1408, a customer update transaction database 1404, a customer loyalty transaction database 1410, a customer pending transaction database 1414, an update database 1402, an EDCU audit file 1406, an EDCU administrative file 1412, and an EDCU data management module 1416.

Security engine 1408 may be used to provide suitable security measures with respect to data flowing through EDCU 1012. Toward this end, security engine 1408 may utilize various authentication, data encryption, and digital signature techniques in connection with incoming and outgoing message packets. Suitable algorithms in the context of the present invention, may include, for example, DES encryption, RSA authentication, and a variety of other symmetrical and non-symmetrical conventional cryptographic techniques.

Customer update transaction database 1404 may be used to store information which has been updated on a fob 102, but which has not yet propagated to the various databases and networks that require updating. For example, a fob 102 may be used to change fob user preferences in the course of a transaction with a particular enterprise. This information may, in the short term, be stored in database 1404 (for the particular enterprise) until it could be fanned-out to FODUS 1006 and the appropriate EDCUs 1012 and EDSIs 1008. This type of transaction is described in further detail below.

Customer loyalty transaction database 1410 may be suitably used to store loyalty information (e.g., frequent flier, frequent stayer, etc.) associated with a particular enterprise or partner. In an alternate embodiment, a loyalty transaction database 1410 may not be employed rather, the functionality of database 1410 may be incorporated into databases 1402, 1410, and 1414 such that a loyalty transaction becomes just another transaction modality to be tracked by EDCU 1012.

Customer pending transaction database 1414 may be suitably used to store information related to transactions which have taken place without direct use of the fob 102. More particularly, some transactions, such as preference changes and the like, may be initiated by a fob user through a channel which does not involve use of the fob, for example, through a verbal request over a standard telephone. In such a case, and as detailed further below, this data may be suitably stored in pending transaction database 1414. The transaction data remains in database 1414 until the corresponding fob 102 may be used in conjunction with POS device 110, whereupon fob 102 itself (as well as FODUS 1006) may be updated with this new information.

Update database 1402 may be suitably used to store other types of transactions (i.e., transactions which may not be classifiable as update, loyalty or pending). For example, update database 1402 may be employed to store file structure updates as detailed below.

Audit file 1406 may be used to track changes to update database 1404, pending database 1414, database 1402, and, in an illustrated embodiment, loyalty database 1410. In an alternate embodiment, wherein no separate loyalty database 1410 is used, audit file 1406 may track changes to databases 1404, 1414, and 1402. Audit file 1406 therefore may help to ensure the integrity of data in the respective files.

Administrative file 1412 may provide suitable database software configured to edit, update, delete, synchronize, and ensure non-corruption of data stored within the various databases that may comprise EDCU 1012 (i.e., databases 1402, 1404, 1410, and 1414).

Data management module 1416 may provide data management capabilities to facilitate data transfer between fobs 102 and databases 1404, 1414, 1402, and 1410 as well as between these databases and the other systems (i.e., update logic system 1010 and FODUS 1006). Thus, data management module 1416 may act as interface to ensure seamless transfer of data between the various systems.

The various components, databases, modules, and apparatus described above in connection with the invention are connected via a suitable data communication network. Such a network may consist of various physical connections using a variety of conventional data protocols, for example, the TCP/IP protocol. It will be appreciated that the individual connections between components of the present system may differ. For example, a wireless PCS network may be employed from POS device 110 to secure support client server 1004, while an Internet TCP/IP connection may be employed from FODUS 1006 to the various EDCUs 1012.

Those skilled in the art will appreciate that a variety of hardware systems are suitable for implementing the present invention. Various modems, routers, CPU's, monitors, back-up systems, power-supplies, and peripherals may be employed to realize the benefits of the present system. In one embodiment, for example, a Compaq Prolinea computer operating in an OS/2 environment using IBM MQ Server software may be used to implement secure support client server 1004, wherein the various POS devices may comprise stand-alone fob kiosks, an EDCU 1012 and FODUS 116 may then be implemented on a Compaq Prolinea computer operating in a Windows/NT environment running a suitable database software package.

Figure 18:
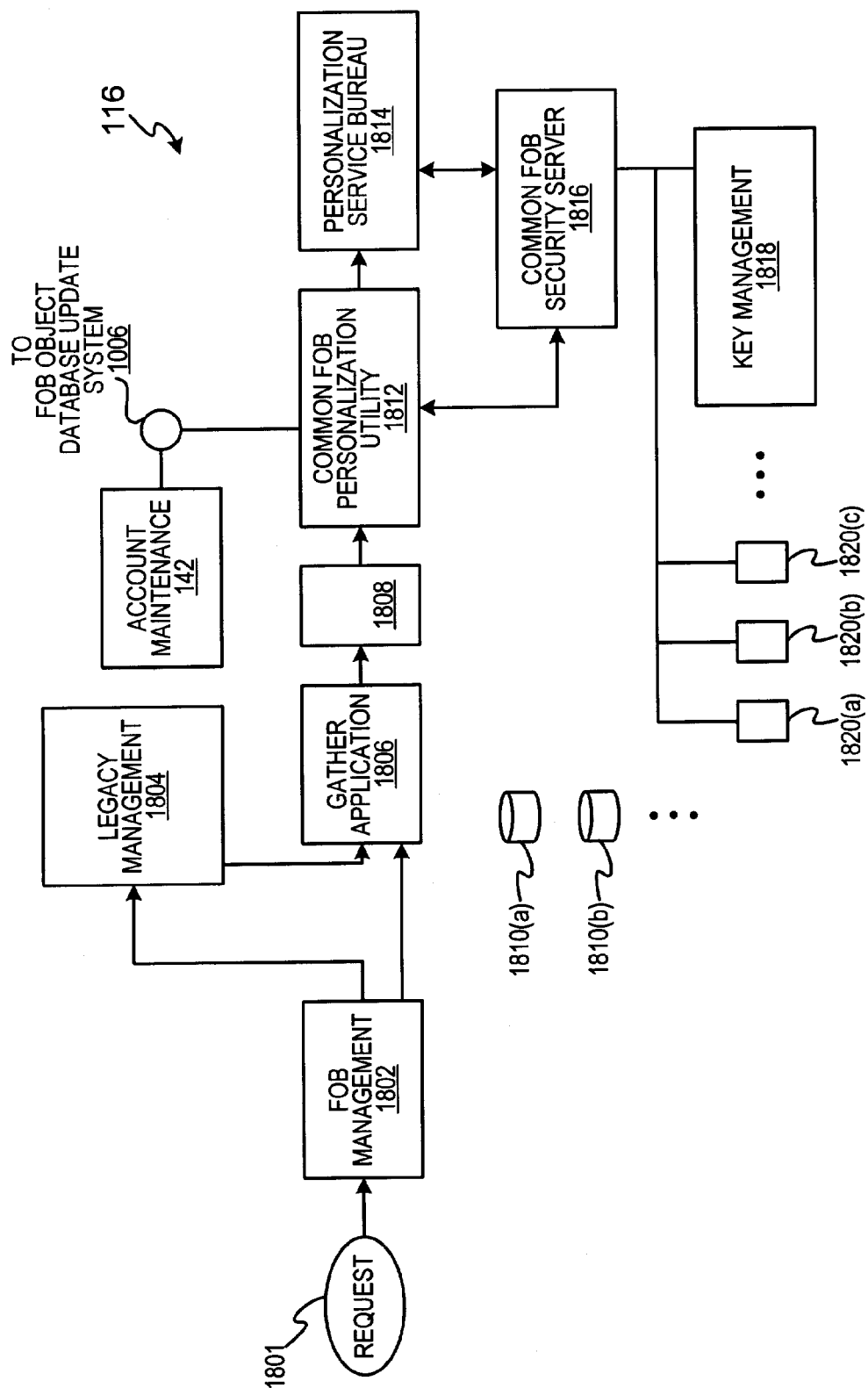
FIG. 18 is a schematic overview of an exemplary personalization system.

Referring now to FIG. 18, in an exemplary embodiment, personalization system 116 may suitably comprise a fob management system 1802, a legacy management system 1804, a gather application module 1806, one or more databases 1810, an activation block 1808, a common fob personalization utility 1812 (CCP), a service bureau 1814, a common fob security server 1816, a key management system 1818, and one or more key systems 1820. Personalization system 116 may be in communication with fob 102 via RF ISO 14443 interface 114 for populating fob database 212 with the security keys for facilitating authentication of the unique RFID reader 104 identifier. In addition, personalization system 116 may populate on database 212 a unique fob 102 identifier for use by RFID reader 104 in determining whether fob 102 may be authorized to access system 100. Personalization system 116 may populate (e.g., inject) the encrypted fob 102 account number into fob database 214 for later providing to authenticated RFID reader 104. Personalization system 116 may additionally populate travel-related information into fob database 212 for later providing to RFID reader 104, third-party travel partners, and/or issuer systems.

In one exemplary embodiment, personalization system 116 may include any standard computing system as described above. For example, personalization system 116 may include a standard personal computer containing a hardware security module operable using any conventional graphic user interface. Prior to populating the security key information account number, unique identifying information, and travel-related information into fob 102 or RFID reader 104, the hardware security module may authenticate fob 102 and RFID reader 104 to verify that the components are authorized to receive the secure information.

Key management system 1818 may suitably comprise a database module, CID replace module, key system, and key system. CCP 1812 may suitably communicate with FODUS 1006 (shown in FIG. 10), and legacy management system 1804 may suitably communicate with account maintenance 142 which may also be configured to communicate with FODUS 1006.

Fob management system 1802 may suitably receive the fob request 1801 and initiate the gathering of information from various sources. Generally, fob request 1801 may consist of various request information intended to specify a desired group of fob characteristics. Such characteristics may include, for example: a list of desired applications (airline, hotel, rental car, etc.); a designation of whether the fob is new, a renewal, or a replacement; a list of default fob user preferences corresponding to the desired applications; personal information related to the fob user (name, address, etc.); and required security levels.

Fob management system 1802 may suitably parse the fob request and, for information already stored by the issuer, sends a request to legacy fob management system 1804. For information not available as legacy data, fob management system 1802 may forward the relevant components of fob request 1801 to gather application module 1806. In an exemplary embodiment, fob management system 1802 may choose the optimum fob physical characteristics for a particular fob request 1801. That is, fob management system 1802 may suitably determine the appropriate type of fob chip to be used based on a number of factors, for example, memory requirements and computational complexity of the desired security functions. Similarly, the optimum protocol/sequence controller may be chosen. In an alternate embodiment, the fob transponder, protocol/sequence controller, and the like, may be specified in fob request 1801.

Legacy management system 1804 may act as a suitable repository of information related to the fob user's past relationship, if any, with the fob issuing organization. For example, a fob user may have a long-standing credit or debit account with issuing organization (based on a standard embossed mag-stripe fob) and this information may be advantageously incorporated into the issued fob.

Gather application module 1806 may be suitably configured to receive information from fob management system 1802 and legacy management system 1804 and then interface with the various databases 1810 to gather all remaining application information specified in fob request 1801. In an exemplary embodiment, databases 1810 may correspond to and be associated with the individual partnering enterprises which offer fob applications for use in fob 102 (e.g., networks 112 in FIG. 10). Thus, for example, a fob request 1801 which included a request for a hotel application may trigger gather application 1806 to initiate data communication with the appropriate hotel database 1810. Hotel database 1810 may then return information specifying the correct file structure, access conditions (security), default values, and other data to configure fob 102 with the requested application. Communication with the various databases 1810 may take place through any suitable means, for example, data communication over the Internet, PSTN, and the like, or through other channels, such as simple phone requests.

Activation block 1808 may be suitably used to provide a means for the fob user to activate the fob once it has been issued. For example, it may be common for credit fobs and the like to be sent to the fob user unactivated, requiring that the fob user call (or otherwise contact) an automated system at the issuer in order to activate the fob. This may typically be accomplished via entry of the fob number and other suitable ID using a touch-tone phone. In this regard, activation block 1808 may be used to facilitate this function for the requested fob (i.e., to specify whether such activation is desired or necessary for a particular fob).

CCP 1812 may be used to create a correctly formatted fob "object" (i.e., the operating system, file structure and all other available fob data to be downloaded to fob 102) then transfer this information to service bureau 1814 (for creation of the fob) and FODUS 1006 (for recording the fob's state as issued). CCP 1812 may be configured to tailor the format of the fob object to the specific fob issuance system to be used (described below). Thus, gather application system 1806 may deliver a relatively high-level functionality request, and CCP 1812 can create the specific "object" to be used in the implementation.

Personalization Service Bureau 1814 may comprise suitable hardware and/or software components to complete production of the fobs for issuance to the respective fob users. In this regard, service bureau 1814 may include a suitable fob "printer" to handle the transfer of information to the fob chip as well as any conventional embossing or mag-stripe writing that may take place.

Common fob security server 1816 (CCSS) may suitably comprise software and/or hardware components to retrieve cryptographic key information from various enterprise key systems 1820. In an exemplary embodiment, this information may be accessed by service bureau 1814 in order to complete the personalization process. More particularly, it may typically be the case that a fob 102 contains a number of different applications associated with a wide range of enterprise organizations. One skilled in the art will appreciate that the writing, updating, and reading of these files may be advantageously restricted to particular parties in accordance with a set of access condition rules. These access conditions may be suitably implemented using cryptographic keys which are known by the appropriate parties. Thus, service bureau 1814, whose task it is to create and populate the fob file structure, may not, ab initio, have access to the keys to perform this function. As mentioned briefly above, known systems have attempted to solve this problem by accumulating key data in a central repository used in the issuance process, thereby creating an unacceptable security risk. Methods in accordance with the present invention, however, may allow for communication between the fob and the individual key systems 1820 as the fob is being issued, thus allowing key information to be securely downloaded to the fob without the intervention of a third party. CCSS 1816 may be suitably used to facilitate this process by receiving information from CCP 1812 regarding the identity of the various applications to be created in the various fobs, then, when prompted by service bureau 1814 (or, alternatively, prior to issuance by service bureau 1814), contacting the appropriate key system 1820 to request a key to be transmitted to service bureau 1814 during personalization.

Key systems 1820 may comprise suitable database systems capable of storing, generating, and securely transmitting cryptographic keys associated with a particular enterprise. Key management system 1818 may be, in this context, a system comparable to key systems 1820, but which is "owned" by the party implementing the personalization system. The key-generating function may be distributed between CCSS 1816 and key systems 1820. That is, the keys may be generated in real time at CCSS 1816 (in accordance with algorithms and key information received from the particular enterprises), rather than being generated at key systems 1820.

It will be appreciated to one skilled in the art that the functional blocks illustrated in FIG. 18 may be implemented using a variety of hardware and/or software components, both off-the-shelf and/or custom-developed. Database-intensive functions performed, for example, by fob management system 1802, may be implemented using any suitable database package, (e.g., Codebase, dBase, or the like).

A personalization system as described above in conjunction with FIG. 18 may be suitably used to efficiently issue a large number of fobs with a wide range of functionality levels. This task may involve obtaining and coordinating, in a timely fashion, accurate data for individual fob users across the various partnering enterprises supported by the system. In this regard, it may be the case that certain partnering enterprises desire to limit the dissemination of proprietary data. This data may include, for example, private keys used in connection with fob access conditions as well as file structure and fob user personal data.

Figure 19:
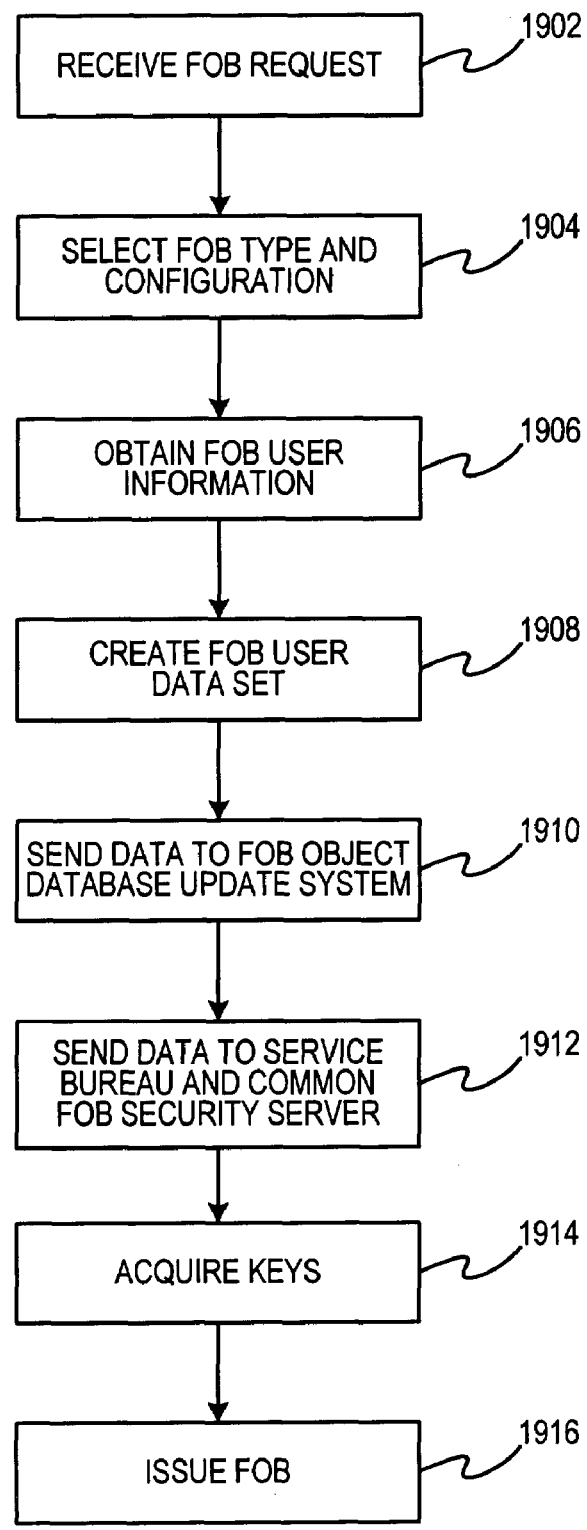
FIG. 19 is a flowchart depicting an exemplary method of fob personalization.

Referring now to FIGS. 18 and 19, an exemplary fob personalization process will now be described. First, the system may receive a fob request (step 1902). As mentioned above, fob management system 1802 may be suitably used to receive the fob request and initiate the gathering of information from various sources. Fob request 1801 may suitably consist of request information intended to specify a desired group of fob characteristics. Such characteristics may include, for example: a list of desired applications (airline, hotel, rental car, etc.); a designation of whether the fob is new, a renewal, or a replacement; a list of default fob user preferences corresponding to the desired applications; personal information related to the fob user (name, address, etc.); and required security levels.

Next, in step 1904, the system may select the fob type and configuration appropriate for the given fob request 1801. This step may be suitably performed by fob management system 1802. Thus, fob management system 1802 may examine a number of factors in light of information received in fob request 1801 (e.g., memory requirements, desired security functions, and the like), then may select an appropriate fob chip from a library of available chips. In the same way, the optimum fob operating system (FOS) may also be selected.

In step 1906, fob user information may be obtained. This step may be suitably performed by gather application module 1806 operating in conjunction with databases 1810 and legacy management system 1804. More particularly, fob user-specific information may be classified in two groups: information known to the personalization system, and information not known by the personalization system. Known information generally may consist of data acquired through a past relationship with the organization hosting the personalization system. In such a case, certain data such as fob user name, preferred billing address, title, company, etc., may most likely already be known, as will certain application data. Such information may be suitably stored in, and may be retrieved from, one or more databases comprising legacy management system 1804. As part of step 1906, the system (specifically, module 1808) may determine whether the fob should require activation. That is, as mentioned briefly above, it may be common to apply a sticker or the like to a fob that notifies the fob user that activation of the fob is required prior to use. Activation typically involves the use of an automated phone system or internet website). The choice of whether a particular fob requires activation may be based on a number of factors, for example, demographics, crime-rate numbers, or mail fraud statistics associated with the fob user's zip-code number.

For data not included in legacy management system 1804, gather application module 1806 may suitably communicate with databases 1810 to retrieve the information needed to satisfy fob request 1801. This information may typically consist of file structure information (e.g., the DF and EF hierarchy, data types and lengths, and access condition specifications for the particular enterprise-sponsored application). For example, in the case where fob request 1801 may include a request for an airline application, gather application module 1806 may contact the database corresponding to the enterprise hosting the airline application, then download the relevant file structure information. This process may continue in turn for each new or modified application to be incorporated into the fob.

In step 1908, a full fob user data set may be created, suitable using CCP 1812. This data set, or "fob object," may ultimately be used by service bureau 1814 to create the physical fob. The form of the fob object may vary. In one embodiment, the fob object may comprise a Binary Large Object ("BLOB"). The fob object may be tailored to the selected fob configuration (e.g., chip type and operating system as specified in step 1904), the content of fob user information data (gathered in step 1906), and the intended fob "printer" (i.e., the apparatus used to create the finished fob within service bureau 1814). This allows the system, in the preceding steps, to specify file structures, data types, and the like, without concerning itself with how this structure will be encoded onto the fob or how the data will be accessed. Up until step 1908, the system need only develop a relatively high-level model of the intended fob data structure; the specifics may be substantially invisible to all but CCP 1812.

In an alternate embodiment, various details of the fob data object may be determined at a prior point in the system. That is, the functionality of CCP 1812 may be distributed among various components of the system.

Having created the fob user data set, or fob object, in step 1908, this data may then be sent to FODUS 1006 (step 1910). This ensures that the DSS (particularly FODUS 1006) has a record of the fob state at the time of personalization. This information may then be immediately available to account maintenance system 142.

The fob object may then be sent to service bureau 1814 and (if required) CCSS 1816 (step 1912). In step 1914, the relevant keys may be acquired to allow service bureau 1814 to create the finished fob. As mentioned above, step 1914 may be suitably performed by CCSS 1816 concurrently or serially with the issuance process. In one embodiment, as each individual fob may be being created using an issuance system suitably located at service bureau 1814, service bureau 1814 interrogates CCSS 1816 for the appropriate cryptographic keys. These keys have either been retrieved from key systems 1820 and 1818 earlier (i.e., after step 1912), or may be retrieved in real-time in response to the request from service bureau 1814. Alternatively, the keys may be retrieved by CCSS 1816 and transmitted to CCP 1812 prior to transmission of the fob object to service bureau 1814. In either case, the key or keys may then be retrieved for inclusion in the fob object created in step 1908.

In step 1916, the actual fob may be issued. Service bureau 1814 may suitably download the fob object into the correct fob hardware using the correct cryptographic keys. The initialized fob may then be packaged and distributed to the appropriate fob user in accordance with conventional methods.

A dynamic synchronization system as described above in various embodiments may be used to track the "state" of the consumer's fob. The state of the fob may be suitably characterized by the structure of applications used in the fob and the various pieces of data that are stored within these applications.

The manner in which applications and data are managed within a fob can vary. For example, data files and directories may be stored in a "tree" structure in fob 102. That is, the fob file structure suitably resembles the well-known MS-DOS (Microsoft Disk Operating System) file structure wherein files are logically organized within a hierarchy of directories. Specifically, three types of files are defined in ISO 7816-4: dedicated files (DF), elementary files (EF), and a master file (MF). The master file may be analogous to the MS-DOS "root" directory, and contains all other files and directories. Dedicated files may actually be directories or "folders" for holding other DFs or EFs. Thus, the MF may contain an arbitrary number of DFs, and these DFs may or may not contain other DFs. Elementary files may be used to store user data, and may exist within a dedicated file, or within the master file. Higher level DFs (i.e., DFs which house particular applications) are often referred to as application dedicated files (ADFs). The scope of the present invention is not, however, limited to this type of multi-function fob. Other implementations, for example, Multos or Java-based fobs, may also be suitable within the context of the instant invention.

A number of synchronization issues may arise in the multi-function fob context; indeed, three paradigmatic cases reoccur with some frequency, and relate to: 1) update transactions, 2) pending transactions, and 3) file structure changes. Each of these cases will now be described in turn with respect to the present invention.

It may be quite common for a fob user to make a local change to fob 102 which may not be immediately reflected in all the databases which could advantageously make use of this information. For example, suppose that upon initialization (i.e., when the fob was originally issued via personalization system 116) the fob user's fob 102 was configured to reflect a general preference for smoking (e.g., one file contains a Boolean field keyed to smoking/non-smoking), but the fob user now wishes to change this general preference file to reflect a non-smoking preference.

Figure 17:
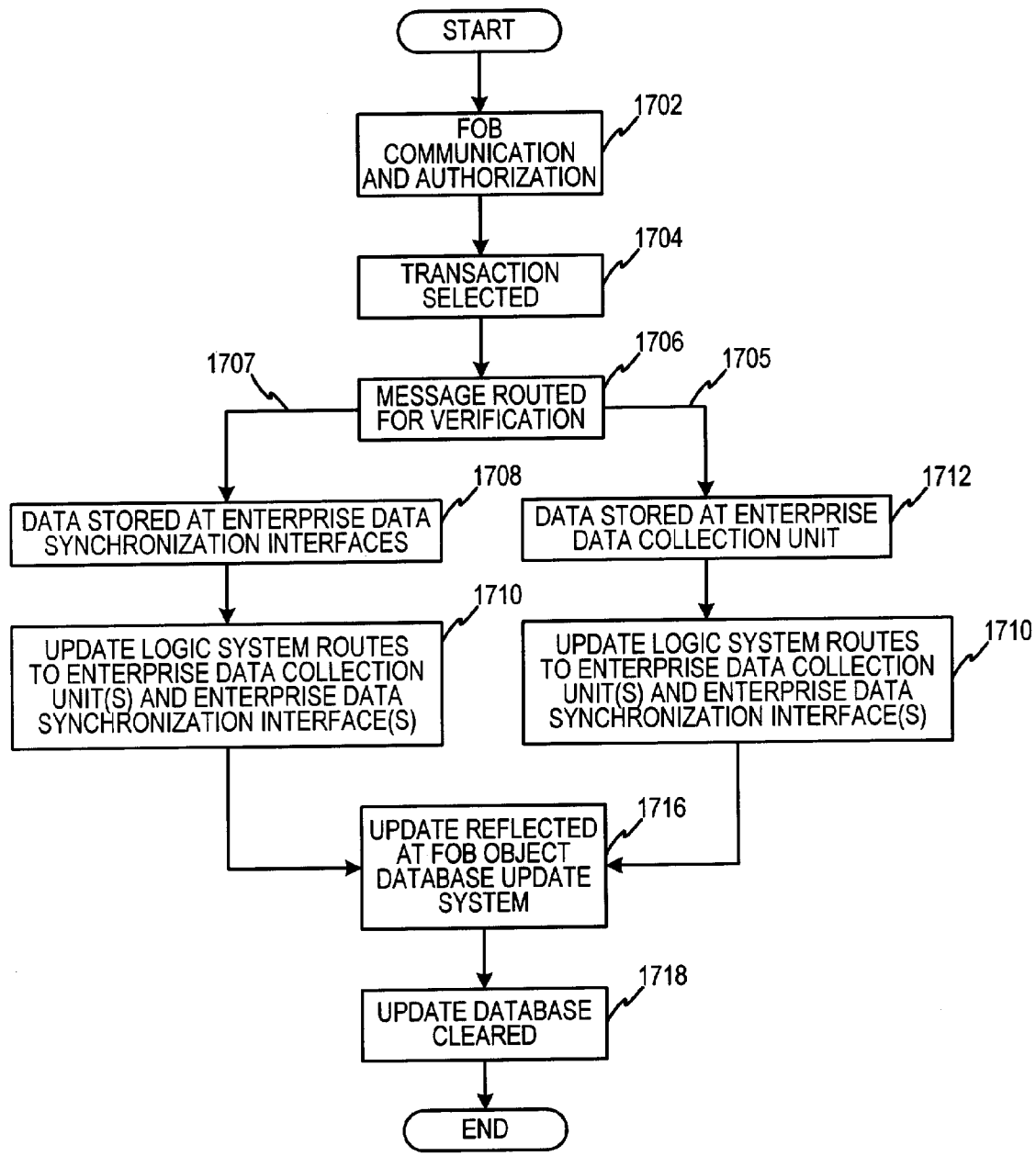
FIG. 17 is a flowchart depicting an exemplary method for synchronizing update transaction information.

In this case, referring now to FIGS. 10 and 17, and with respect to an exemplary embodiment, the fob user suitably may use fob 102 to communicate with a conveniently located POS device 110 via RFID reader 104, whereupon authentication of the fob and/or fob-reader may take place (step 1702). In an exemplary embodiment, authentication may take place in accordance with relevant sections of the ISO 7816 standard.

Next, the fob user may use a suitable user interface (supplied by POS device 110 working in conjunction with server 1004) in order to perform a transaction (i.e., to request a change to the preferences file) (step 1704). This change may typically be reflected at the fob 102 immediately. That is, POS device 110 and/or server 1004 may include the functionality to access and update the appropriate files within fob 102.

Communication router 1106 in server 1004 may then routes the transaction to the appropriate party (i.e., an EDSI 1008 or an EDCU 1012) corresponding to branches 1707 and 1705 respectively. That is, depending on the system configuration, the file to be changed may be associated with a particular enterprise or, alternatively, may be associated with the organization hosting the DSS. These two cases are described in turn.

Following branch 1707 in FIG. 17, the change data may be sent to and stored in the appropriate EDSI 1008 (step 1708). Update logic system 1010 may then transfer this change request to the appropriate EDCU 1012 (i.e., the EDCU 1012 corresponding to the particular EDSI) (step 1710). This information may be suitably stored in the corresponding update database 1404. The information may be also distributed to other EDSIs. In the instant example, update logic system 1010 may identify those systems that may benefit from knowing the fob user's smoking status. Such systems may include, for example, various hotels, rental car agencies, and the like.

Alternatively, following branch 1705 in FIG. 17, the data may first be stored at the appropriate EDCU (step 1712), then distributed to other EDUCs 1012 and EDSIs 1008 as described above.

The fob data change may then be transferred to FODUS 1006. Specifically, the various fields and files associated with the fob 102 may be updated to reflect the change stored in update database 1404. Thus, the information within FODUS 1006 may conform to that contained within fob 102 and the various EDCUs 1012 and EDSIs 1008. After this transfer, the corresponding change data in update database 1404 may be cleared (step 1718).

The fob user may make a change or perform a transaction through a channel that does not directly involve fob 102, thus creating an inconsistency between the data in fob 102 and the data in various databases throughout the DSS. Such a case may arise, for example, when the fob user calls a hotel to make a reservation (rather than performing the transaction on line using fob 102) and makes an oral request to change his preferences from smoking to non-smoking.

Figure 16:
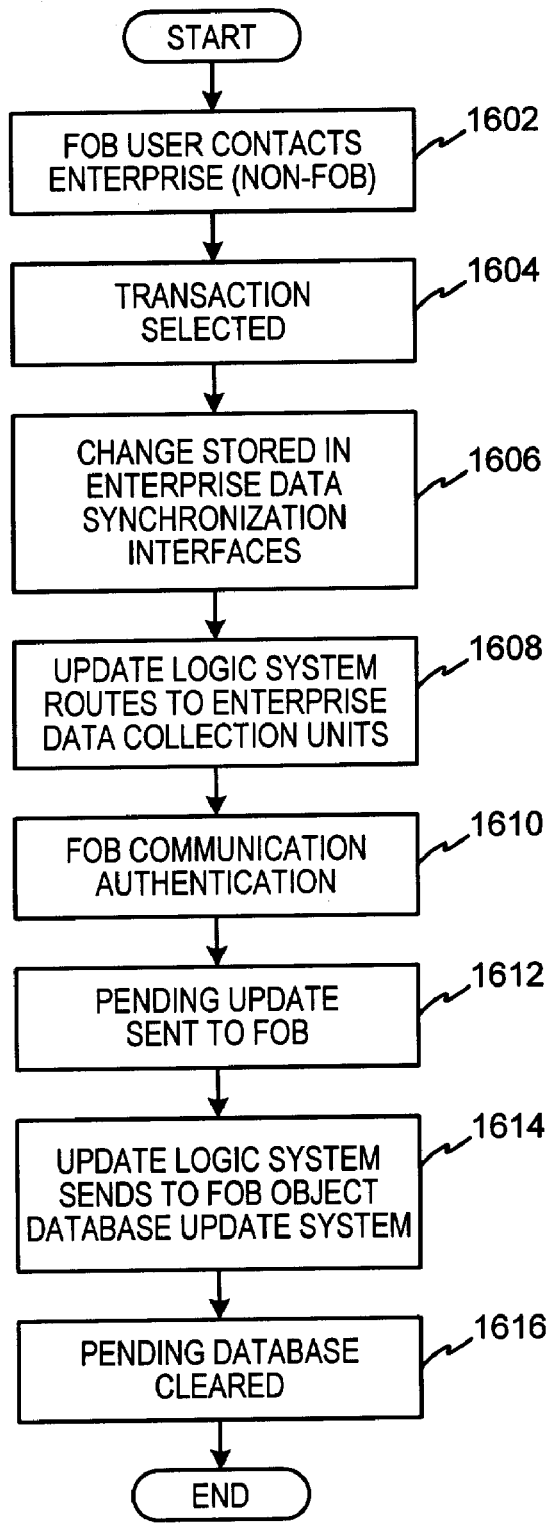
FIG. 16 is a flowchart depicting an exemplary method for synchronizing pending transaction information.

Referring now to FIGS. 10 and 16, in this case, with respect to an exemplary embodiment of the present invention, the fob user first may contact an enterprise through a means that does not include fob 102 (i.e., a "fob not present" transaction) (step 1602). Using an appropriate interface (voice, keypad, etc.), a change or transaction may be selected (step 1604). This change may then be stored locally within a particular network 112 and/or may be stored within an EDSI 1008 (step 1606).

Next, in step 1608, update logic system 1010 may route this information to the corresponding EDCU 1012, where it resides in pending database 1414. At this point, fob 102 itself may be oblivious to the change. As a result, if the fob user were to initiate a fob-present transaction, the corresponding enterprise may likely look first to the data structure in fob 102 for preferences, and as just stated, may most likely arrive at the wrong conclusion (e.g., a smoking room may be assigned notwithstanding the fob user's expressed preference).

In order to remedy this situation, the present invention provides, in steps 1610 and 1612, a method by which the fob may be updated upon its next use. That is, after fob 102 may be used to communication with POS device 110 via RFID reader 104 and may be suitably authenticated (step 1610), the system interrogates pending database 1414 to determine whether any changes have been made. If so, the appropriate information may be downloaded to fob 102 (step 1612).

After the above information transfer is successfully completed, the change data may be transferred to FODUS 1006 (step 1614), where it may be stored within fob object database 212. Finally, the respective information within pending database 1414 may be cleared (step 1616).

In addition to the data-related modifications detailed above, changes to the structure of data stored in fob 102 may also be desirable in certain contexts. That is, during the life of a fob, it may be likely that the fob issuer, a partnering enterprise, or the fob user himself may desire to extend the fob's functionality by augmenting the suite of applications housed within the fob. For example, a fob user who may use a fob for rental car and airline reservations may also wish to use the fob for acquiring and paying for hotel reservations. In such a case, the appropriate hotel partner may process the fob user's request and arrange for addition of a hotel application to be added to the fob file structure. In another example, the fob issuer may authorize the addition of a new application on its own, for example, a credit and/or debit application. Conversely, it may also be appropriate in some instances to remove applications from the fob.

In an exemplary embodiment, the types of file structure changes described above may be handled in a manner analogous to the procedure set forth in FIG. 16, depending, to some extent, upon which party originates the file structure change. That is, as in step 1612, the appropriate file structure change information may be stored in EDCU 1012 (for example, in database 1402), and then transferred to fob 102 when the fob is used in conjunction with an on-line transaction (steps 1610 and 1612). After the file structure on fob 102 is augmented or otherwise modified, FODUS 1006 (specifically, database 1016) may be similarly modified to reflect the change. The change information may then be cleared from database 1402 (step 1616).

Although the invention has been described herein in conjunction with the appended drawings, those skilled in the art will appreciate that the scope of the invention is not so limited. Modifications in the selection, design, and arrangement of the various components and steps discussed herein may be made without departing from the scope of the invention as set forth in the appended claims. For a detailed explanation of dynamic synchronization and personalization for a smart-card, see U.S. Pat. No. 6,199,762, dated Mar. 13, 2001, titled "METHODS AND APPARATUS FOR DYNAMIC SMART-CARD SYNCHRONIZATION AND PERSONALIZATION," incorporated herein by reference.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The invention claimed is:

1. A system for facilitating synchronizing transponder information associated with a transponder, said system comprising:
   a first enterprise data collection unit of a first enterprise that stores update transactions and pending transactions associated with said transponder and said first enterprise;
   a second enterprise data collection unit of a second enterprise that stores update transactions and pending transactions associated with said transponder and said second enterprise;
   at least one point-of-sale device including a transponder-reader communicatively coupled with said transponder and said first and second enterprise data collection units;
   an object database system that stores said transponder information based, at least in part, on at least one of said update transactions and said pending transactions, wherein said transponder information includes a data object having at least one application, and wherein said object database system is communicatively coupled to said first and second enterprise data collection units; and
   an update logic system that routes said transponder information from said first and second enterprise data collection units to at least one of said point-of-sale device in order to effect synchronization of said transponder information associated with said transponder and said object database system.

2. A system according to claim 1, further comprising an update logic system coupled to at least one enterprise data synchronization interface, said update logic system configured to securely route transponder information between said enterprise data synchronization interface and said enterprise data collection units, said enterprise data synchronization interface coupled to an enterprise network configured to communicate with said point-of-sale device.

3. The system according to claim 2, further comprising a secure support client server configured to communicate with said point-of-sale device, said secure support client server further configured to adaptively provide communication functionality in accordance with the communication functionality available at said point-of-sale device.

4. The system of claim 1, further including a personalization system comprising:

a security server;

at least one key system associated with said at least one application, said key system configured to communicate with said security server and to supply a key in response to a request from said security server;

a personalization utility configured to receive said data object and to communicate with said security server;

said personalization utility further configured to add said key to said data object;

a transponder management system, said transponder management system configured to accept a transponder request and communicate said transponder request to said personalization utility; and a gather application module configured to communicate with said transponder management system and gather application information from a first database and a second database in accordance with said transponder request, wherein said first database is associated with said first enterprise, and said second database is associated with said second enterprise.

* * * * *